(12) United States Patent
Zuniga

(10) Patent No.: US 12,456,293 B2
(45) Date of Patent: Oct. 28, 2025

(54) SYSTEM AND METHOD FOR LABELING AN IMAGE

(71) Applicant: INNOVATION EXCHANGE LLC, Colleyville, TX (US)

(72) Inventor: Brandon Val Zuniga, Dallas, TX (US)

(73) Assignee: INNOVATION EXCHANGE LLC, Colleyville, TX (US)

( * ) Notice: Subject to any disclaimer, the term of this patent is extended or adjusted under 35 U.S.C. 154(b) by 232 days.

(21) Appl. No.: 17/796,670

(22) PCT Filed: Feb. 26, 2021

(86) PCT No.: PCT/US2021/019896
§ 371 (c)(1),
(2) Date: Jul. 31, 2022

(87) PCT Pub. No.: WO2021/173992
PCT Pub. Date: Sep. 2, 2021

(65) Prior Publication Data
US 2023/0334845 A1    Oct. 19, 2023

Related U.S. Application Data

(60) Provisional application No. 62/981,898, filed on Feb. 26, 2020.

(51) Int. Cl.
*G06V 10/94* (2022.01)
*G06F 3/0482* (2013.01)
(Continued)

(52) U.S. Cl.
CPC .......... *G06V 10/945* (2022.01); *G06F 3/0482* (2013.01); *G06V 10/95* (2022.01);
(Continued)

(58) Field of Classification Search
CPC . G06V 10/945; G06F 3/0482; G06F 3/04842; G09G 5/38; G09G 2340/0464; G09G 2345/00
See application file for complete search history.

(56) References Cited

U.S. PATENT DOCUMENTS 5,548,763 A   8/1996 Combs
5,655,106 A   8/1997 Smith
(Continued)

*Primary Examiner* — Stephen R Koziol
*Assistant Examiner* — Michael Kim Maiden
(74) *Attorney, Agent, or Firm* — J. Miguel Hernandez; James R. Gourley; Carstens, Allen & Gourley, LLP

(57) ABSTRACT

A system and method for adding at least one label to at least one image. The system can comprise a computer and a user interface comprising an image display and at least one input device configured to permit a user to communicate with the computer. The system is configured to perform a method for adding a label to an image comprising at least one element. In a second aspect, the method comprises several steps including: displaying an image to a user on an image display of a user interface; receiving a positional indication from the user identifying a selected location on the image; and adding a label to the image at a location corresponding to the positional indication. The label comprises a symbolic designation identifying an element of the image, the symbolic designation generated by a system comprising the user interface and without the user fully specifying the symbolic designation.

23 Claims, 26 Drawing Sheets

(51) Int. Cl.
*G06V 30/414* (2022.01)
*G06V 30/422* (2022.01)

(52) U.S. Cl.
CPC .......... *G06V 30/414* (2022.01); *G06V 30/422* (2022.01); *G06V 2201/134* (2022.01)

(56) References Cited

U.S. PATENT DOCUMENTS

| | | | |
|---|---|---|---|
| 5,774,833 A | 6/1998 | Newman | |
| 5,805,412 A | 9/1998 | Yanagisawa | |
| 5,877,746 A | 3/1999 | Parks | |
| 5,946,647 A | 8/1999 | Miller | |
| 5,956,038 A | 9/1999 | Rekimoto | |
| 5,960,411 A | 9/1999 | Hartman | |
| 5,996,026 A | 11/1999 | Onodera | |
| 6,054,991 A | 4/2000 | Crane | |
| 6,452,925 B1 | 9/2002 | Sistanizadeh | |
| 6,611,725 B1 * | 8/2003 | Harrison | G06T 19/00 700/98 |
| 6,788,527 B2 | 9/2004 | Doczy | |
| 6,842,769 B1 | 1/2005 | Kim | |
| 6,847,959 B1 | 1/2005 | Arrouye | |
| 6,868,444 B1 | 3/2005 | Kim | |
| 6,952,428 B1 | 10/2005 | Necka | |
| 7,370,360 B2 | 5/2008 | van der Made | |
| 7,734,778 B2 | 6/2010 | Tsao | |
| 7,761,414 B2 | 7/2010 | Freedman | |
| 7,761,558 B1 | 7/2010 | Jindal | |
| 7,808,918 B2 | 10/2010 | Bugenhagen | |
| 7,913,226 B2 | 3/2011 | Lowell | |
| 7,925,692 B2 | 4/2011 | Dunagan | |
| 7,996,785 B2 | 8/2011 | Neil | |
| 7,996,835 B2 | 8/2011 | Griffith | |
| 8,041,739 B2 | 10/2011 | Glasgow | |
| 8,046,364 B2 | 10/2011 | Kahn | |
| 8,046,721 B2 | 10/2011 | Chaudhri | |
| 8,074,172 B2 | 12/2011 | Kocienda | |
| 8,134,831 B1 | 3/2012 | Hernandez | |
| 8,208,245 B2 | 6/2012 | Staats | |
| 8,219,567 B2 | 7/2012 | Serdy, Jr. | |
| 8,225,314 B2 | 7/2012 | Martins | |
| 8,335,931 B2 | 12/2012 | Lee | |
| 8,386,610 B2 | 2/2013 | Yahalom | |
| 8,438,154 B2 | 5/2013 | Harik | |
| 8,776,050 B2 | 7/2014 | Plouffe | |
| 8,843,603 B1 | 9/2014 | Liu | |
| 8,935,706 B2 | 1/2015 | Ellis | |
| 8,942,694 B2 | 1/2015 | Woo | |
| 8,996,695 B2 | 3/2015 | Anderson | |
| 8,996,891 B2 | 3/2015 | Tabone | |
| 9,270,753 B2 | 2/2016 | Park | |
| 9,542,201 B2 | 1/2017 | Jau | |
| 9,542,360 B2 | 1/2017 | Tran | |
| 9,549,056 B2 | 1/2017 | Hawkins | |
| 9,569,045 B2 | 2/2017 | Westerman | |
| 9,578,272 B2 | 2/2017 | Kim | |
| 9,600,353 B2 | 3/2017 | Aguera y Arcas | |
| 9,709,411 B2 | 7/2017 | Barth | |
| 9,875,671 B2 | 1/2018 | Gharpure | |
| 9,946,229 B2 | 4/2018 | Park | |
| 9,965,151 B2 | 5/2018 | Zaveri | |
| 10,073,516 B2 | 9/2018 | Larsen | |
| 10,417,341 B2 | 9/2019 | Schick | |
| 2004/0059994 A1 | 3/2004 | Fogel | |
| 2005/0234885 A1 | 10/2005 | Szeto | |
| 2006/0064471 A1 | 3/2006 | Hewett | |
| 2008/0065723 A1 | 3/2008 | Corboy | |
| 2009/0144240 A1 | 6/2009 | Singh | |
| 2009/0276694 A1 | 11/2009 | Henry | |
| 2011/0246875 A1 * | 10/2011 | Parker | G06F 3/0482 715/702 |
| 2012/0116559 A1 | 5/2012 | Davis | |
| 2012/0297059 A1 | 11/2012 | Bross | |
| 2013/0125069 A1 * | 5/2013 | Bourdev | G06V 20/30 715/863 |
| 2013/0247136 A1 | 9/2013 | Chieu | |
| 2013/0262968 A1 | 10/2013 | Gartman | |
| 2014/0317096 A1 | 10/2014 | Elias | |
| 2015/0156554 A1 | 6/2015 | Sirpal | |
| 2016/0147434 A1 * | 5/2016 | Lee | G06F 3/0482 715/838 |
| 2017/0075877 A1 | 3/2017 | Lepeltier | |
| 2018/0232361 A1 | 8/2018 | Schick | |
| 2019/0332674 A1 | 10/2019 | Schick | |

* cited by examiner

SYSTEM AND METHOD FOR LABELING AN IMAGE

CROSS-REFERENCE AND RELATED APPLICATIONS

This application claims priority to U.S. Provisional Application No. 62/981,898, filed on Feb. 26, 2020, entitled "SYSTEM AND METHOD FOR LABELING AN IMAGE," which is incorporated herein by reference in its entirety as an example.

BACKGROUND OF THE INVENTION

Technical Field

This disclosure relates to systems and methods for adding at least one label to at least one image. In some embodiments, this disclosure relates to adding at least one label to at least one image while only requiring a user to identify a location on an image where the label should be applied. In some embodiments, this disclosure relates to a one-click method for applying at least one label to an image. In some embodiments, this disclosure relates to a one-click method for applying each of a plurality of labels to an image. In some embodiments, this disclosure relates to efficiently enabling a user to change the substance, position, orientation, or format of a label before, during, or after adding the label to an image. In some embodiments, this disclosure relates to systems and methods for adding at least one reference number and lead line to a figure in a patent application.

Background

Throughout this Background section and throughout this application, various known components are described with reference to patent applications, publications of patent applications and patents. Every patent application, publication of a patent application, and patent listed or referenced in this application (collectively the "cited references") is hereby incorporated by reference in its entirety as an example. The cited references merely provide illustrative examples. None of the definitions or limitations in these cited references limit the disclosure or claims in this application unless the definitions or limitations are specifically copied into the present application. Accordingly, the language expressly appearing in this application is controlling over any text incorporated by reference, but not expressly included in this application. Furthermore, the terms of this application are to be construed in accordance with their ordinary meaning in the art unless some other meaning is made evident in the disclosure of this application, excluding any disclosure that is only incorporated by reference and has not actually been expressly set forth in this application.

Some examples of known components referenced in this application include, but are not limited to, computers and systems comprising computers. (See, e.g., U.S. Pat. No. 9,709,411B2, U.S. Pat. No. 9,542,201B2, U.S. Pat. Nos. 5,548,763A, and 5,655,106A.) However, this does not mean that the components listed in this application, including, but not limited to, computers and systems comprising computers, are known as part of or in combination with the systems and methods described in the present application. Nonetheless, upon reading the disclosure of the present application, a person having ordinary skill in the art (i.e., a "skilled person") would be able to use or modify existing components, including, but not limited to, computers and systems comprising computers, to make and use the systems and methods described in this application.

Examples of computers and systems comprising computers include, but are not limited to, a computing environment (see, e.g., U.S. Pat. No. 9,600,353B2), a personal computer (see, e.g., U.S. Pat. No. 9,709,411B2, U.S. Pat. Nos. 9,542,201B2, 5,548,763A, and 5,655,106A), a desktop computer (see, e.g., U.S. Pat. Nos. 9,709,411B2, 9,542,201B2, 5,548,763A, and 5,655,106A), a laptop computer (see, e.g., U.S. Pat. Nos. 5,805,412A, and 8,134,831B1), a notebook computer (see, e.g., U.S. Pat. Nos. 5,805,412A, and 8,134,831B1), a tablet computer (see, e.g., U.S. Pat. Nos. 8,208,245B2, and 6,788,527B2), a handheld computer (see, e.g., U.S. Pat. Nos. 5,946,647A, 8,046,721B2, 8,074,172B2, 6,847,959B1, 8,942,694B2, 7,761,414B2, US2012/0116559A1, U.S. Pat. Nos. 9,549,056B2, and 9,569,045B2), an integrated office system (see, e.g., U.S. Pat. No. 5,877,746A), a virtual reality system (see, e.g., U.S. Pat. No. 6,054,991A), a personal digital assistant (see, e.g., U.S. Pat. Nos. 9,549,056B2, and 9,569,045B2), a smart phone (see, e.g., U.S. Pat. Nos. 5,946,647A, 8,046,721, 8,074,172B2, 6,847,959B1, 8,942,694B2, 7,761,414B2, US2012/0116559A1, U.S. Pat. Nos. 9,549,056B2, and 9,569,045B2), a smart watch (see, e.g., U.S. Pat. No. 9,946,229B2), a smart television set (T.V.) (see, e.g., US20150156554A1, and U.S. Pat. No. 9,578,272B, a network server (see, e.g., U.S. Pat. Nos. 6,452,925B1, 6,842,769B1, 6,868,444B1, 6,952,428B, 7,808,918B2, and 8,935,706B2), a cloud server (see, e.g., U.S. Pat. No. 9,270,753B2, US20120297059A1, and US20130247136A1), a virtual server (see, e.g., U.S. Pat. Nos. 8,776,050B2, 8,386,610B2, and 7,734,778B2), a cloud-based computer (see, e.g., U.S. Pat. Nos. 8,996,695B2, 8,843,603B1, 8,996,891B2, 9,875,671B2, and 9,965,151B2), a virtual machine (see, e.g., U.S. Pat. Nos. 7,913,226B2, 7,996,835B2, 5,996,026A, and 8,776,050B2), a virtual personal computer (see, e.g., U.S. Pat. Nos. 8,335,931B2, 7,370,360B2, 7,996,785B2, and 8,225,314B2) a network (see, e.g., U.S. Pat. Nos. 6,452,925B1, 6,842,769B1, 6,868,444B1, 6,952,428B, 7,808,918B2, and 8,935,706B2), the internet (see, e.g., U.S. Pat. Nos. 7,761,558B1, 8,438,154B2, US20090144240A1, US20050234885A1, US20080065723A1, U.S. Pat. No. 5,956,038A, US20060064471A1, U.S. Pat. Nos. 8,219,567B2, and 7,925,692B2), or any combination thereof.

Interfaces permitting a user to interact with a computer or a system comprising a computer are well known. (See, e.g., any of the patents or publications cited with reference to computers or systems comprising computers.) However, this does not mean that interfaces permitting a user to interact with a computer or a system are known as part of or in combination with the systems and methods described in the present application. Nonetheless, upon reading the disclosure of the present application, a skilled person would be able to use or modify existing interfaces to make and use the systems and methods described in the present disclosure.

Examples of interfaces permitting a user to interact with a computer or a system comprising a computer include, but are not limited to, an image display (e.g., monitor, touch-screen), a controller for a visible location selector (e.g., a controller, a controller for a cursor, a controller for an arrow, a mouse, a joystick, a key, a keyboard, a touch pad, a touch screen, a sensor to detect movement of a user, or any combination thereof), a controller, a controller for a cursor, a controller for an arrow, a mouse 0310, a joystick, a key, a keyboard 0306, a touch pad, a touch screen, a sensor to detect movement of a user, a sound detector (e.g., microphone), a sound maker (e.g., speaker), a virtual reality system (see, e.g., U.S. Pat. No. 6,054,991A), a virtual reality headset (see, e.g., U.S. Ser. No. 10/073,516B2), a head mounted display (see, e.g., U.S. Ser. No. 10/073,516B2), a sensor, a vibrator, a robot, a light detector 0324 (e.g., camera), or any combination thereof.

Certain standards for creating patent drawings and related symbols and labels are known. (See, e.g., 37 C.F.R. § 1.84 (2019), which is incorporated herein by reference in its entirety as an example.). However, this does not mean that these standards, symbols and labels are known as part of or in combination with the systems and methods described in the present application.

Additionally, systems and methods exist for determining the elements of a claim, checking the elements of a claim for proper antecedent basis, proofing the text of a patent application, and editing the text of a patent application. However, this does not mean that these systems and methods are known as part of or in combination with the systems and methods described in the present application. Nonetheless, upon reading the disclosure of the present application, a skilled person would be able to use or modify existing systems and methods to make and use the systems and methods described in the present disclosure.

Examples of systems and methods for determining the elements of a claim, checking the elements of a claim for proper antecedent basis, proofing the text of a patent application, editing the text of a patent application, preparing parts of a patent application, or combinations thereof are provided, for example, in US20040059994A1, US20090276694A1, US20130262968A1, US20140317096A1, US20170075877A1, 20180232361, 20190332674, U.S. Pat. Nos. 5,774,833A, 9,542,360B2, 8,041,739B2, 8,046,364B2, U.S. Ser. No. 10/417,341B2. Every application, patent application publication and patent recited in this paragraph is hereby incorporated by reference herein as an example.

Examples of systems and methods for determining the elements of a claim, checking the elements of a claim for proper antecedent basis, proofing the text of a patent application, editing the text of a patent application, preparing parts of a patent application, or combinations thereof are also provided by existing software, including PatentOptimizer® patent drafting technology available from LexisNexis IP North America Offices, having an address at 2331 Mill Road, Suite 300, Alexandria, Virginia 22314, United States of America; TurboPatent® patent drafting technology available from TurboPatent, having an address at 105 S Main St., Suite 240, Seattle, Washington 98104, United States of America, and Specifico® patent drafting technology, available from Specificio, Inc., having an address at 4676 Admiralty Way, Room 210, Marina Del Rey, California 90292, United States of America.

Various existing computing devices are capable of being used to add labels to images, for example, to create drawings for a patent application. However, existing computing devices and methods of applying labels to images have a somewhat cumbersome user interface or operating system. For example, existing devices and methods for applying labels to images lack the ability to apply a reference number to an image with a single action, for example, the click of a mouse or touch of a touchpad or touchscreen.

Also, existing devices and methods lack the ability to either receive or automatically identify a list of elements recited in a patent claim that correspond to elements in a patent figure.

Moreover, existing devices and methods lack the ability to automatically select each element in a list of elements and display a default reference number for the element, thereby allowing the user to identify, for example, by clicking, a location in a patent figure or other image where the element corresponding to the reference number is illustrated.

Furthermore, existing devices lack the ability to easily and efficiently change the image to which a reference number should be applied, for example, with a single keystroke, combination of keys or a mouse click.

Additionally, existing devices lack the ability to easily change a default reference number, lead line, or other symbol used to identify a location on a drawing as corresponding to an element identified by a specific reference number.

Similarly, existing devices lack the ability to easily change a default orientation of a reference number, lead line, or other symbol used to identify a location on a drawing as corresponding to an element identified by a specific reference number.

Accordingly, many existing devices and methods lack the ability to streamline a plurality of interactions with a user into a single interaction, thereby eliminating several time-consuming steps that would otherwise occur.

Advantageously, however, one or any selection of these advantages can be provided in a novel system or method for labeling an image as described in the present disclosure.

SUMMARY OF SELECTED EMBODIMENTS OF THE INVENTION

In a first aspect, the invention comprises a system. The system comprises a computer and a user interface. The user interface is in communication with the computer. The user interface comprises an image display and at least one input device configured to permit a user to communicate with the computer. The system is configured to perform a method for adding a label to an image, the image comprising at least one element. The method comprises several steps. A first step comprises displaying the image to the user on the image display, the user interface configured to allow the user to move a visible location selector over a selected location on the image and identify the selected location, the at least one input device comprising a controller configured to control the visible location selector. A second step comprises receiving a positional indication from the user identifying the selected location on the image. A third step comprises adding a label to the image at a location corresponding to the positional indication, the label comprising a symbolic designation to identify an element of the at least one element, the symbolic designation for the label being (i) generated automatically by the system or (ii) generated without the user fully specifying the symbolic designation.

In a second aspect, the invention comprises a method for adding at least one label to at least one image, each image in the at least one image comprising at least one element. The method comprises several steps. A first step comprises displaying a first image to a user on an image display, the image display being a component of a user interface, the user interface configured to allow the user to move a visible location selector over a first selected location on the first image and identify the first selected location. A second step comprises receiving a first positional indication from the user identifying the first selected location on the first image. A third step comprises adding a first label to the first image at a first location corresponding to the first positional indication, the first label comprising a first symbolic designation to identify a first element of the at least one element of the first image, the first symbolic designation for the first label being generated (i) by a system comprising the user interface and (ii) without the user fully specifying the first symbolic designation.

Additional inventive embodiments will be evident to a person having ordinary skill in the art upon reading this disclosure.

DETAILED DESCRIPTION

Figure 1:
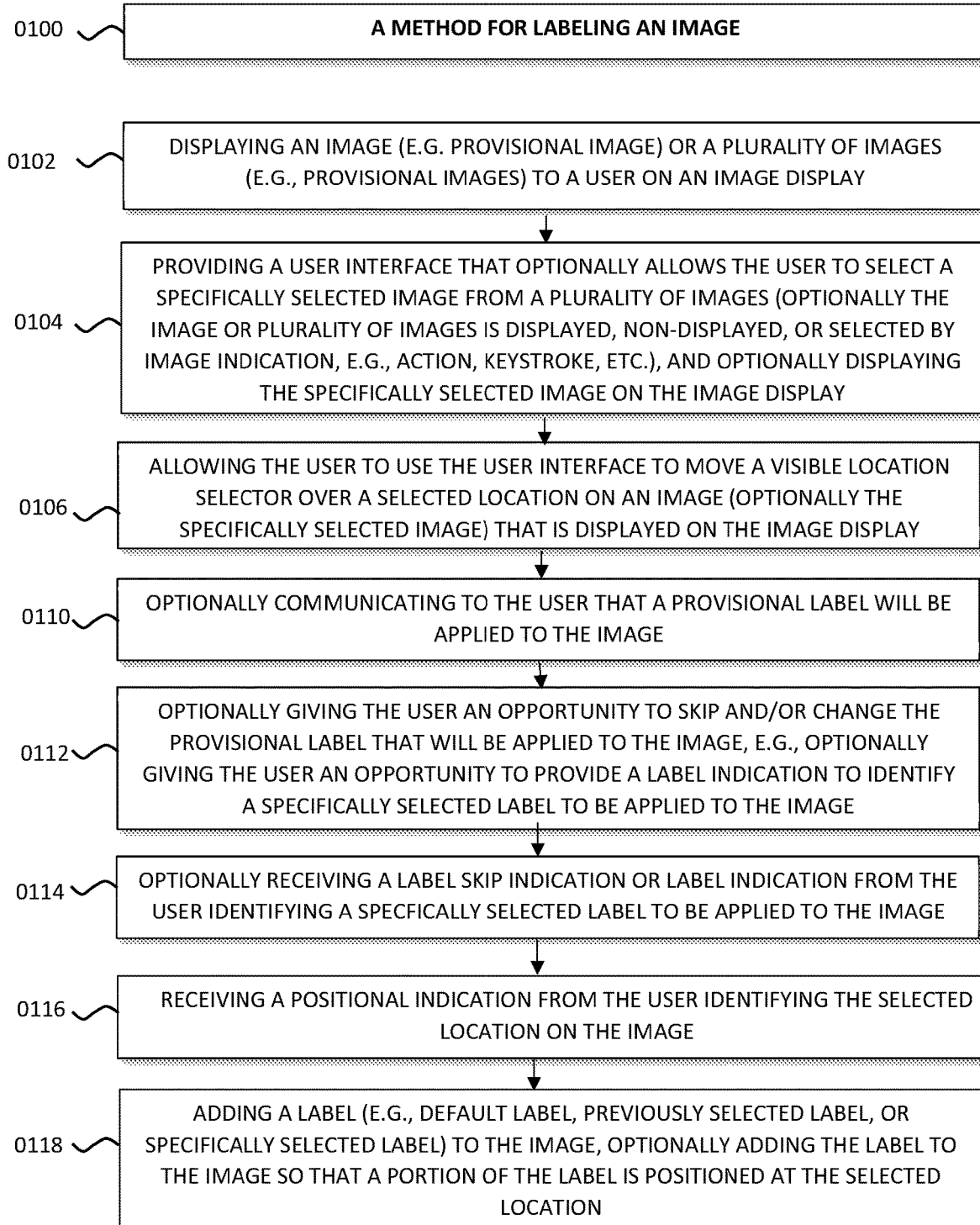
FIG. 1 depicts a schematic flow chart that illustrates an embodiment of a method for labeling an image.

In the following detailed description reference is made to the accompanying drawings which form a part hereof and which provide illustrative examples. Modifications, including, for example, structural changes, substitutions, and rearrangements, can be made to the disclosed examples without departing from the scope of this disclosure.

Unless otherwise indicated, each identical or substantially similar element in the drawings uses the same reference number. However, to avoid unnecessarily cluttering the drawings and causing distraction, the reference numbers for the elements are not repeated on every drawing.

As will be seen in greater detail throughout this disclosure, some embodiments of the systems and methods described in this disclosure can be provided with one or any selection of the following, non-limiting advantages. For example, some of the systems and methods are capable of being used to add labels to images, for example, to create drawings for a patent application. Although great savings in time are provided, these savings are not merely a result of performing steps that were previously done by a human at a faster rate on a computer.

Rather, the systems and methods of this disclosure can be configured to take advantage of a novel process involving the default selection and assignment of one or more tasks to a computer versus a user (e.g., a human), a novel interface configured to communicate the results from the user's work to the computer and the computer's work to the user, the interface also permitting default actions assigned to the computer to be easily overridden by a user when appropriate. This approach can enable the computer to perform many tasks independently and at a far greater speed than a human user, while providing the user with the flexibility to modify the computer's work, for example, with human input when the machine's default results are unsatisfactory.

As can be seen, this approach can enable a user (e.g., human) to more effectively and efficiently perform the tasks for which the user is better-suited and can enable the computer to more effectively and efficiently perform the tasks for which the computer is better-suited. Additionally, in conjunction with an interface permitting effective communication between the user and the computer, this approach can achieve synergies in terms of increased productivity that are not easily accomplished using existing systems and methods. To the contrary, many existing systems and methods for applying labels to images have a somewhat cumbersome user interface or operating system. For example, in view of the present disclosure, a skilled person will recognize that existing devices and methods for applying labels to images unnecessarily assign tasks to a human that a computer could perform more efficiently. As a result, humans can be burdened with making decisions when a human decision is not actually required. In some embodiments, the systems and methods of the present disclosure can remedy this problem by avoiding assigning task or decision to a human when a human action or decision is not actually desirable or required.

Accordingly, in contrast to many existing systems and methods, some embodiments of systems and methods of the present disclosure enable a user to apply a reference number to an image with a single action or two actions, for example, moving a mouse over a location corresponding to the image and clicking the mouse or touching a location corresponding to the image on a touch screen.

Additionally, in some embodiments, the systems and methods of the present disclosure can detect lines of an image (including straight lines, curves, points, circles or any other portion of an image) and, as a default action, place the label so that no portion of the label covers a line of the image (including any straight line, curve, point, circle or any other portion of an image), or can place the label on an image in a way that minimizes the length or area of lines covered by the label or any portion of the label. Optionally, systems and methods of the present disclosure can, as a default action, place the label on an image in a way that minimizes the surface area of lines covered by the label or any portion of the label or preferentially covers any amount of lines of a lower line weight over any amount of lines of a higher line weight, or vice versa. This can be useful, for example, when different line weights are used.

Also, in some embodiments of the present disclosures, systems and methods have the ability to receive a list of elements (e.g., elements recited in a patent claim) that correspond to elements in an image (e.g., a patent figure), automatically identify a list of elements recited in text (e.g., a patent claim) that correspond to elements in an image (e.g., a patent figure), or a combination thereof.

Moreover, in some embodiments, systems and methods of the present disclosure can, for each element in a list of elements, select an element, and display a default reference number for the element. Additionally, in some embodiments, systems and methods of the present disclosure can provide an interface that allows the user to identify, for example, by clicking, a location in an image (e.g., a patent figure, machine drawing, etc.) where the element corresponding to the reference number is illustrated.

In some embodiments, systems and methods of the present disclosure can provide an interface that allows a user to change the image to which a reference number should be applied, for example, with a single action (e.g., a single keystroke, combination of keystrokes, a mouse click, touch on a touchscreen, or any combination thereof).

Additionally, in some embodiments, systems and methods of the present disclosure can provide an interface that allows a user to change a default label (e.g., a default portion of a label, default reference number, default lead line, default symbol, or any combination thereof) used to identify a location on an image as corresponding to an element identified by a specific reference number. For example, in some systems and method of the present disclosure, this can be achieved by providing the user with an interface that allows the user to select the default label or a portion thereof, and then allowing the user to take an action to select a different form for the default label or portion thereof. As an example, a lead line without an arrow on either end may be a default shape for indicating the location on an image that corresponds to an element and its reference number. Such a lead line can actually be positioned to touch the element. However, the lead line can be replaced with a lead line having an arrow at one end that points to an area on an image rather than touching a specific element of the image. As another example, a lead line can be replaced with a line having an arrow at both ends, for example, to depict a distance. If desired, a lead line can also be provided that extends from the reference number to the line having an arrow at both ends. As another example, a lead line can be replaced with a bracket whose open end points toward an area on the image that corresponds to an element and its reference number, which reference number can be adjacent to a point of the bracket opposite the open end of the bracket. Clearly, other configurations are also possible, as a skilled person would recognize upon reading this disclosure.

In some embodiments, systems and methods of the present disclosure can provide an interface that allows a user to change a default orientation of a default label (e.g., a default portion of a label, default reference number, default lead line, default symbol, or any combination thereof) used to identify a location on an image as corresponding to an element identified by a specific reference number. For example, some systems and methods of the present disclosure can provide an interface that allows a user to rotate the default label or a portion thereof with respect to the image, change the length of the default label or a portion thereof, change the width of the default label or a portion thereof, change the position of the default label or a portion thereof, or any combination thereof.

As can be seen, some embodiments of the systems and methods of the present disclosure can provide an interface that allows a user to streamline a plurality of interactions with a user into a single interaction, thereby eliminating several time-consuming steps that would otherwise occur. Of course, other advantages of the methods and systems described in this disclosure will be evident to a skilled person reading this disclosure. Thus, the listing of advantages provided in this disclosure is illustrative and not limiting. Accordingly, while some embodiments of the systems and methods described herein can be provided with one of the advantages described herein or any combination of the advantages described herein, additional embodiments of the systems and methods described herein are not required to provide all or any of the advantages described herein.

For ease of comprehending how the system and method can easily increase the efficiency of providing a plurality of labels to a single image, a relatively straight-forward example of a method 0100, 0200 for labeling an image 0502 will now be described with reference to FIGS. 1, 2 and 11-17, which illustrate an ordered series of steps for the method 0100, 0200. As illustrated, a first step can comprise displaying 0102 an image 0502 to a user 0508 on an image display 0510. A second step can comprise providing 0104 a user interface 0300. A third step can comprise allowing 0106 the user 0508 to move a visible location selector 0602 (e.g. cursor or arrow) over a selected location on the image 0502 or plurality of images that is displayed on the image display 0510. A fourth step can comprise receiving 0116 a positional indication (e.g., via a user clicking a mouse or touching a touch pad or touch screen) from the user 0508 identifying the selected location on the image 0502. A fifth step can comprise adding 0118 a label (e.g., initial label, previously selected label, default label, or specifically selected label 0516) to the image 0502 at a location corresponding to the positional indication. Then, the third step, the fourth step and the fifth step can be repeated, for example, as the image 0502 remains displayed on the image display 0510 and the user interface 0300 comprising the image display 0510 remains provided to the user: (1) to allow 0106 the user to move the visible location selector 0602, (2) to allow a system, comprising the user interface 0300, that performs the method to receive 0116 the positional indication, and (3) to allow the system to add (0118) the label to the image 0502.

As a skilled person would understand upon reading this disclosure, additional advantages can be associated with additional steps, combinations of steps, or orderings of steps as described in this disclosure. Accordingly, this application provides several additional illustrative (i.e., non-limiting) examples of methods for labeling an image.

With reference now to FIG. 1, a method 0100 for labeling an image 0502 can comprise several steps.

Figure 5:
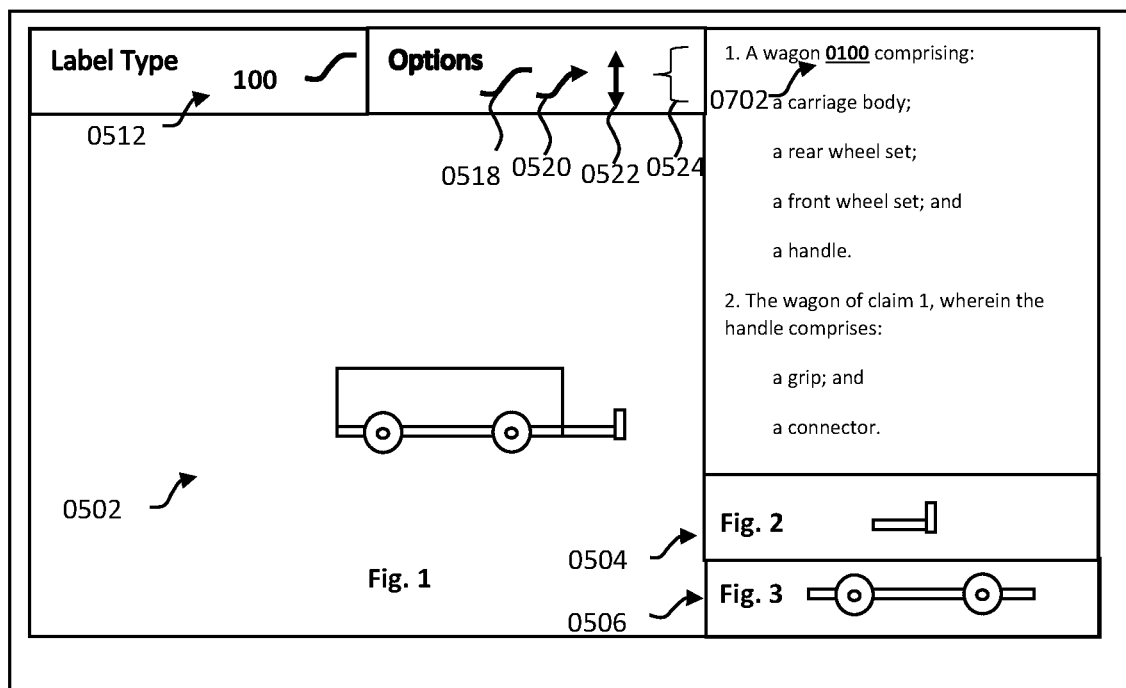
FIGS. 5-9 depict an ordered series of schematic illustrations which provide an example of how a system and method can be used to: communicate to a user that a reference number will be applied to an image as part of a default label (e.g., FIG. 5); permit the user to move an arrow to select a location where the system should locate the default label (e.g., FIG. 6); locate the default label at the selected location and communicate to the user that a second reference number will be applied to the image as part of a second default label (e.g., FIG. 7); permit the user to change the form or type of the first default label so that instead of including a lead line with no arrows, the first default label is changed to include a lead line having an arrow pointing from the reference number to an area on the image, thereby providing a first specifically selected label (e.g., FIG. 8); and permit the user to change the orientation of the first specifically selected label so that the arrow of the lead line points to a different area on the image (see, e.g., FIG. 8 and FIG. 9).
Figure 5:
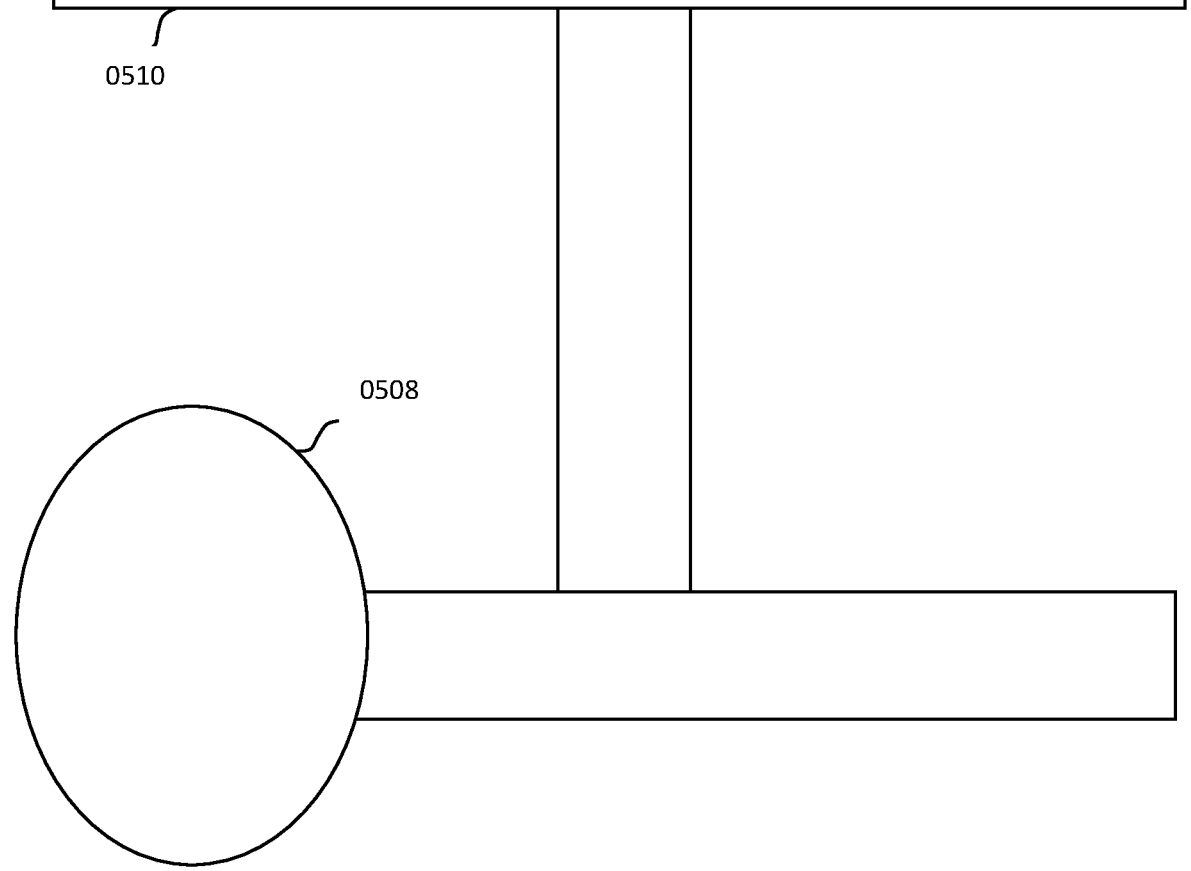

As illustrated, a first step comprises displaying 0102 an image 0502 to a user 0508 on an image display 0510. With reference to FIG. 5, an example of an image is labeled as "FIG. 1" and appears on a monitor 0510.

Figure 3:
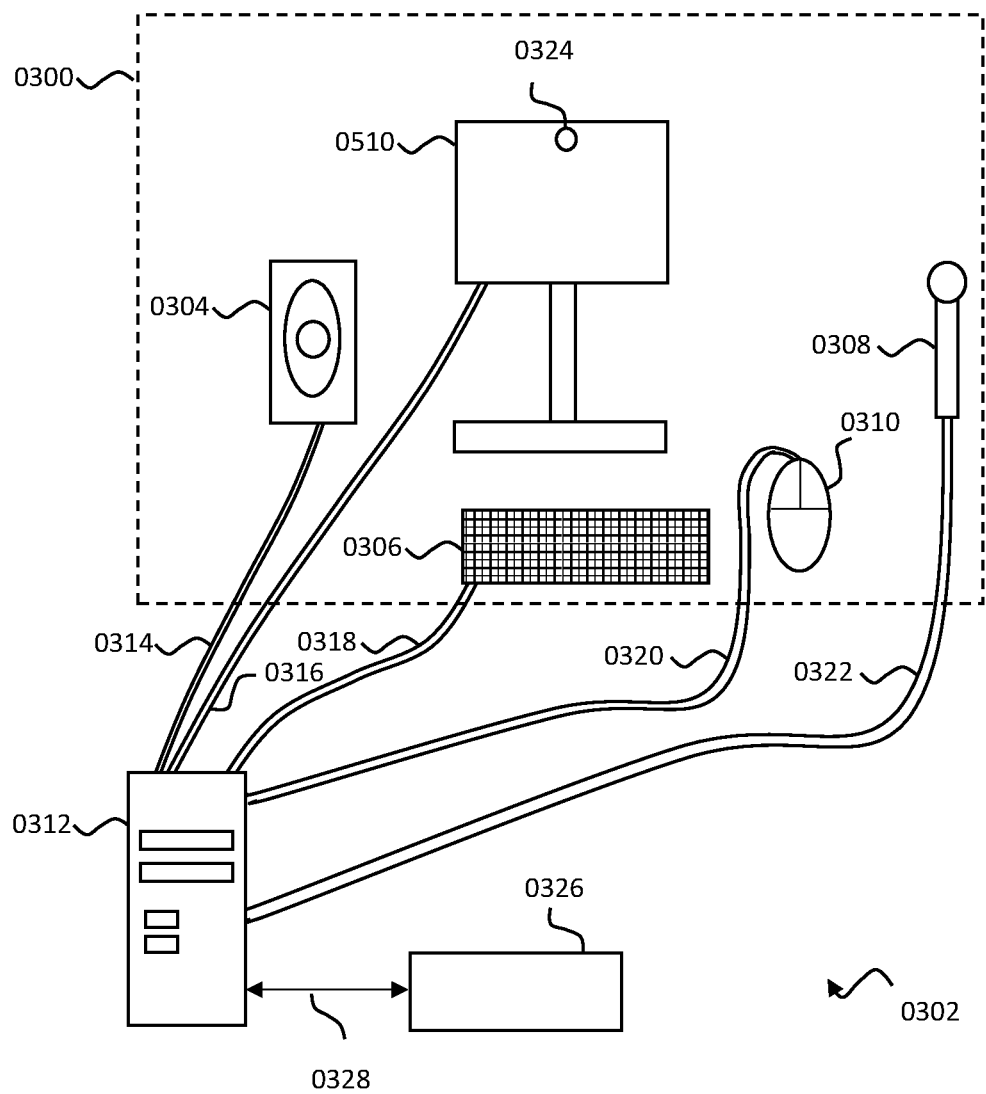
FIG. 3 depicts a schematic illustration of an embodiment of a computer in direct or indirect communication with an embodiment of a user interface, which can comprise several components.
Figure 4:
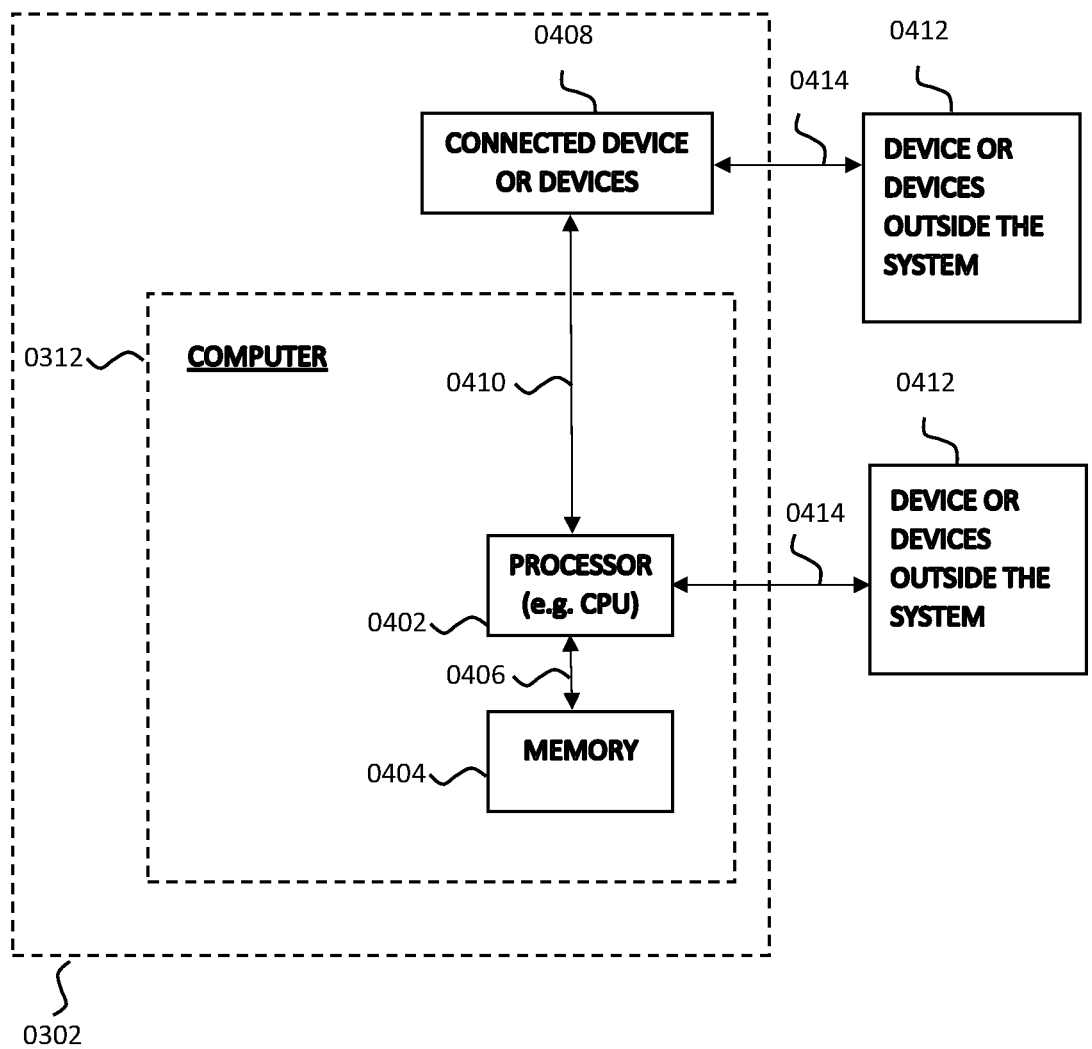
FIG. 4 depicts a schematic illustration of an embodiment of a computer in direct or indirect communication with an embodiment of a connected device or connected devices, which can comprise, for example, a user interface, a router, a network, the internet, a memory storage device or any combination thereof.

As a skilled person would understand upon reading this disclosure, there are many suitable options for displaying an image. With reference to FIG. 3, optionally, the step of displaying 0102 the image 0502 (or any other step described in this application) occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof. By way of example, components that can be included in a user interface 0300 include, but are not limited to, the image display 0510 (e.g., monitor, touchscreen), a controller for a visible location selector (e.g., a controller, a controller for a cursor, a controller for an arrow, a mouse 0310, a joystick, a key, a keyboard 0306, a touch pad, a touch screen, a sensor to detect movement of a user, or any combination thereof) a keyboard 0306, a sound detector 0308 (e.g., microphone), a sound maker 0304 (e.g., speaker), a virtual reality system 0302, a virtual reality headset, a head mounted display, a sensor, a vibrator, a robot, a light detector 0324 (e.g., camera), or any combination thereof.

Figure 18:
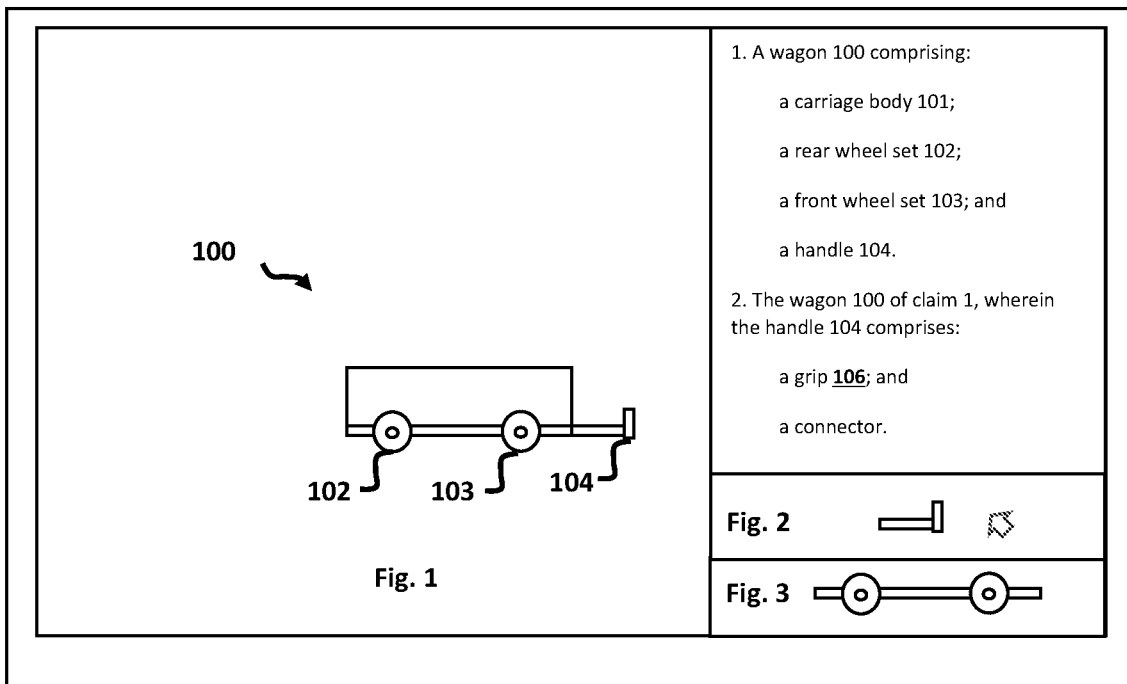
FIGS. 18-20 depict an ordered series of schematic illustrations which provide an example of how a system and method can be used to: display an image or a plurality of images to the user on the image display and permit the user to select a specifically selected image from a plurality of images, for example, by moving a mouse over a location corresponding to the specifically selected image and clicking the mouse once or by touching a touch screen at the location (e.g., FIG. 18); display the specifically selected image on the image display (e.g., FIG. 19); and add a label to the specifically selected image (e.g., FIG. 20).
Figure 19:
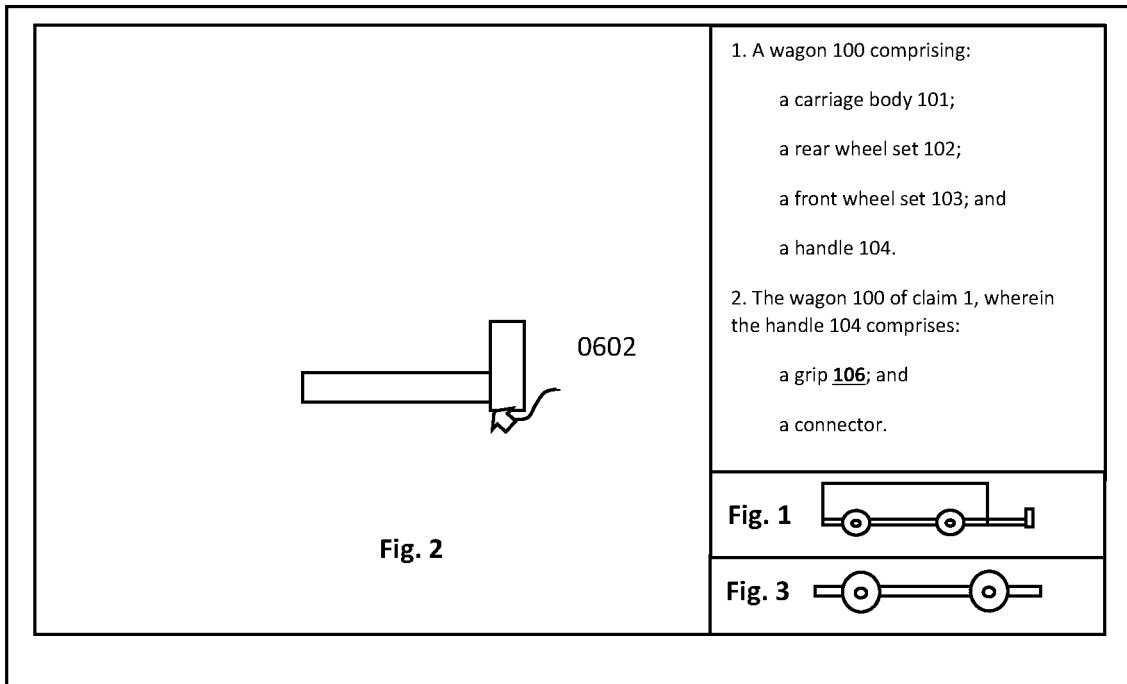

With reference again to the example illustrated in FIG. 1, a second step of the method 0100 for labeling an image 0502 comprises providing 0104 a user interface 0300. Optionally, the user interface 0300 can allow the user 0508 to select a specifically selected image (e.g., image 0502, image 504, or image 506) from a plurality of images (e.g., images 0502, 0504, 050). FIG. 18 and FIG. 19 provides examples of how a user can select a specifically selected image, for example, by using a mouse to position an arrow over the image and clicking the mouse.

Accordingly, an optional third step of the method 0100 for labeling an image 0502 comprises allowing 0106 the user 0508 to select a specifically selected image from a plurality of images. In addition to using a mouse, many other options for selecting an image are possible. For example, the images can be assigned numbers or letters or combinations thereof. Thus, regardless of whether the plurality of images are displayed on an image display, a user can speak or push a key or combination of keys on a keyboard to select a desired image. Accordingly, in some embodiments it can be desirable to display only a single image or a selection of images that is less than the total number of a plurality of images comprising the image or the selection of images. This can be useful to save space on an image display without sacrificing the ability to change the image or images displayed for purposes of adding a label.

Figure 6:
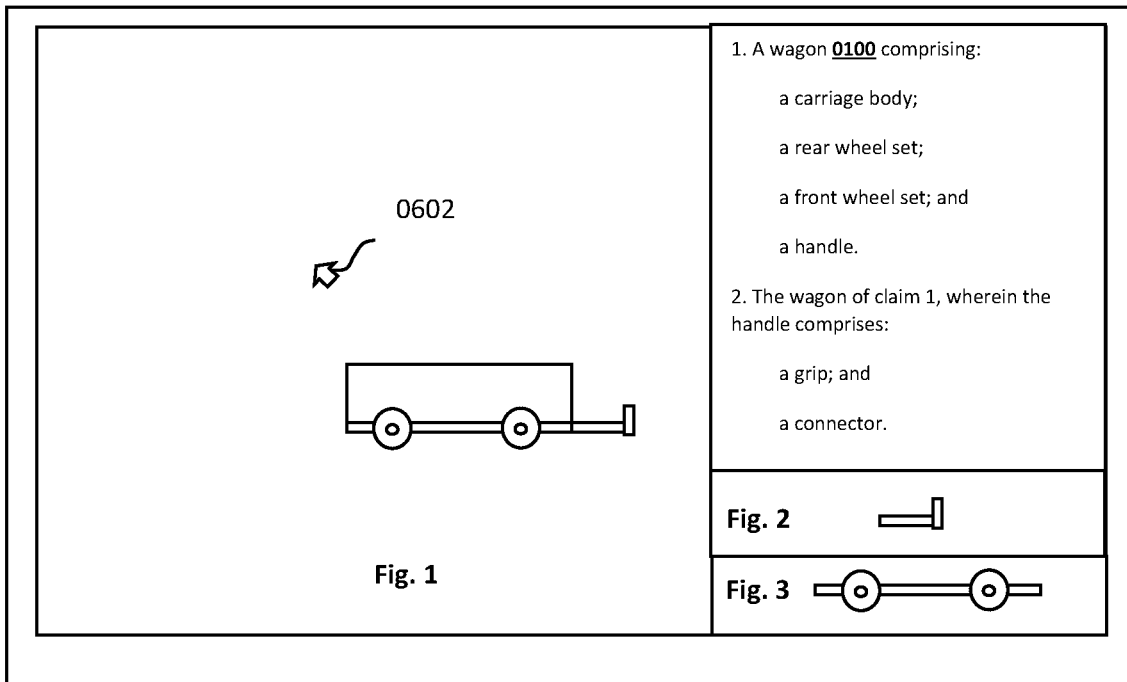

A fourth step comprises allowing 0106 the user 0508 to move a visible location selector 0602 (e.g. cursor or arrow) over a selected location on the image 0502 or plurality of images that is displayed on the image display 0510. An example of the visible location selector 0602 is provided in FIG. 6. Optionally, the user interface (e.g., an input device of the user interface) comprises a controller for the visible location selector 0602 that allows 0106, 0206 the user 0508 to move the visible location selector 0602 over a selected location on the image display.

An optional fifth step comprises communicating 0110 to the user 0508 that a provisional label 0512 will be applied to the image 0502 before adding the label to the image 0502. An example of communicating 0110 to the user that a provisional label 0512 will be applied is provided in FIG. 5. As a skilled person would understand, this step can actually occur at the same time as or after any of the first step, the second step, the third step, the fourth step, any step occurring before the application of the label, or any combination thereof.

A symbolic designation 0702 (e.g., a reference number), as a component of the provisional label 0512 that will be applied, can be selected using any indexing process to successively select each element (e.g., unique or non-redundant element) in a list of elements (e.g., claim elements or parts list elements) appearing in an image or images displayed on the image display. An example of an indexing process is assigning each element in the list of elements an integer number from 1 to the number of elements in the list of elements and indexing through the list by starting with the element assigned the number 1 and then repetitively selecting the element with a number equal to one plus the number of the element that was previously selected until all the elements have been selected for inclusion in a provisional label.

A location indicator (e.g., lead line or other component) of the provisional label 0512 that will be applied can be a provisional lead line or other component. For example, this location indicator can be default component or equivalent to the component that was previously applied.

An optional sixth step comprises giving 0112 the user 0508 an opportunity to skip applying a provisional label 0512 or change a provisional label 0512 (e.g., an initial label, previously selected label, or default label 1102) to a specifically selected label 0516. A provisional label can be skipped, for example, by touching or using a mouse to click on another element in a listing of elements (e.g., appearing in a claim) appearing on the image display. Although label could also be skipped by pressing a key, in which case, a new provisional label could be proposed to the user, and the new provisional label could correspond to a subsequent element in the list of elements.

Figure 7:
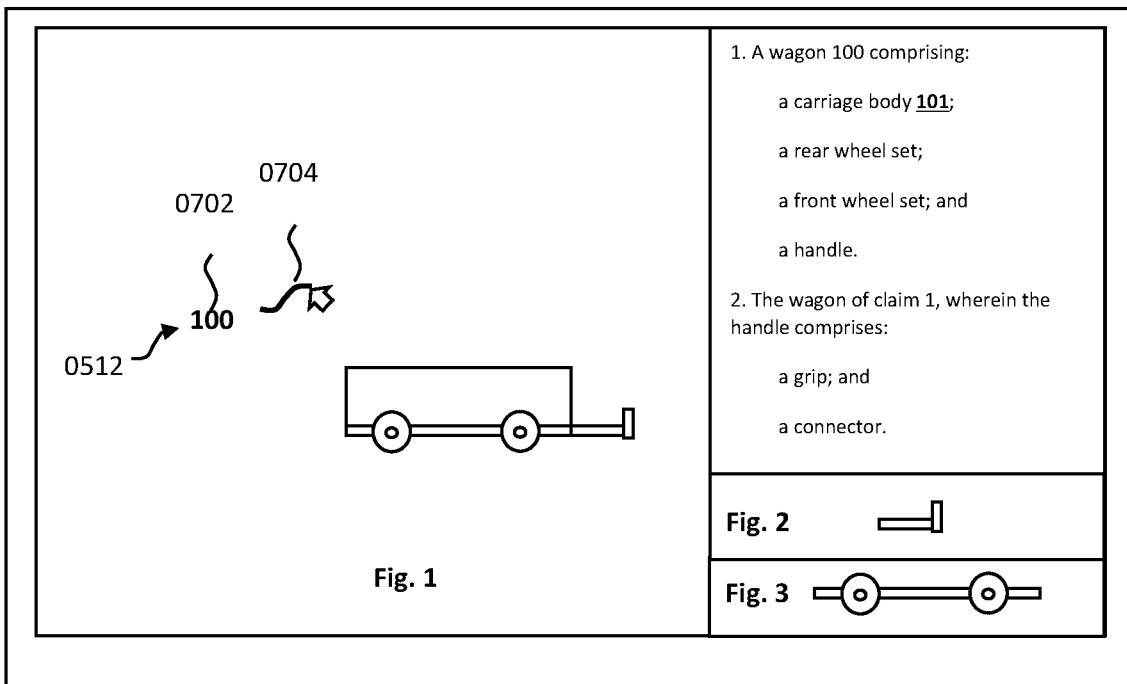
Figure 8:
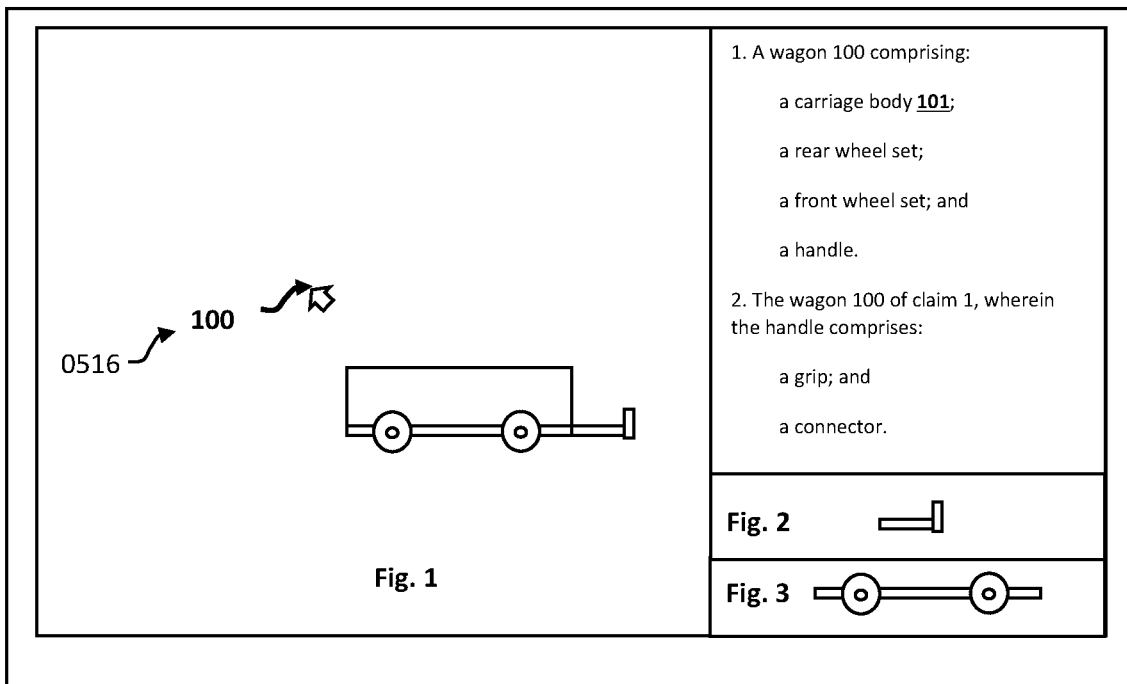
Figure 9:
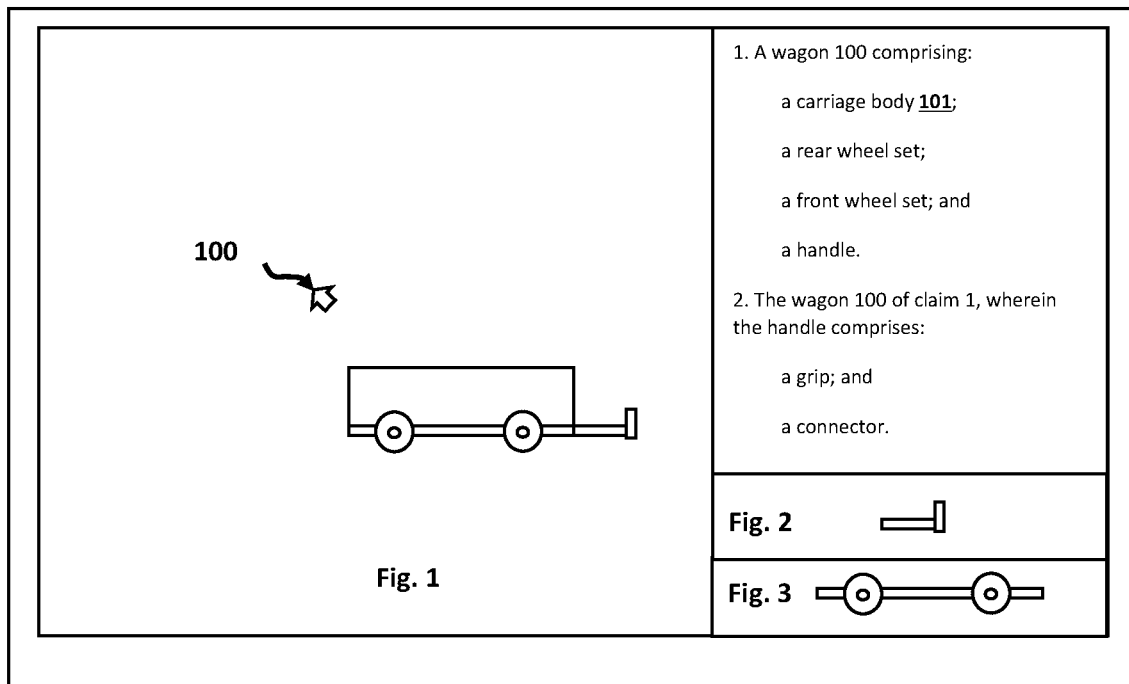
Figure 10:
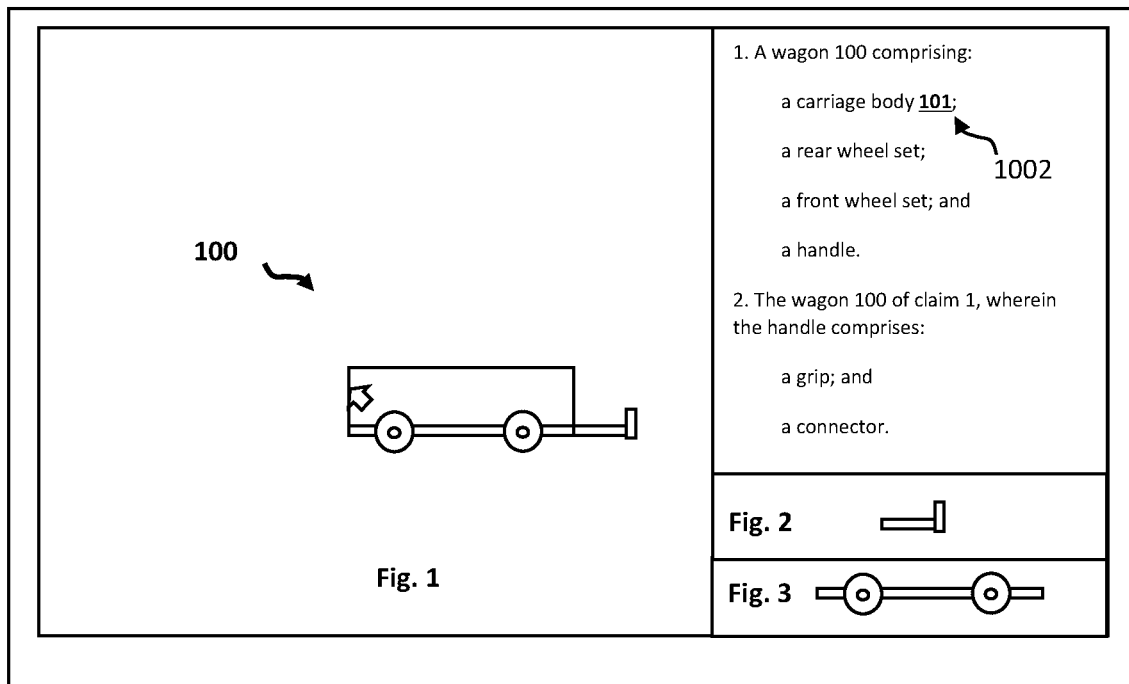
FIGS. 10-17 depict an ordered series of schematic illustrations which provide an example of how a system and method can be used to repeatedly: communicate to a user that a reference number will be applied to an image as part of a default label (e.g., FIGS. 10-17); permit the user to move an arrow to select a location where the system should locate the default label (e.g., FIGS. 10, 12, 14, and 16); and locate the default label at the selected location and communicate to the user that a second reference number will be applied to the image as part of a second default label (e.g., FIGS. 11, 13, 15 and 17).
Figure 11:
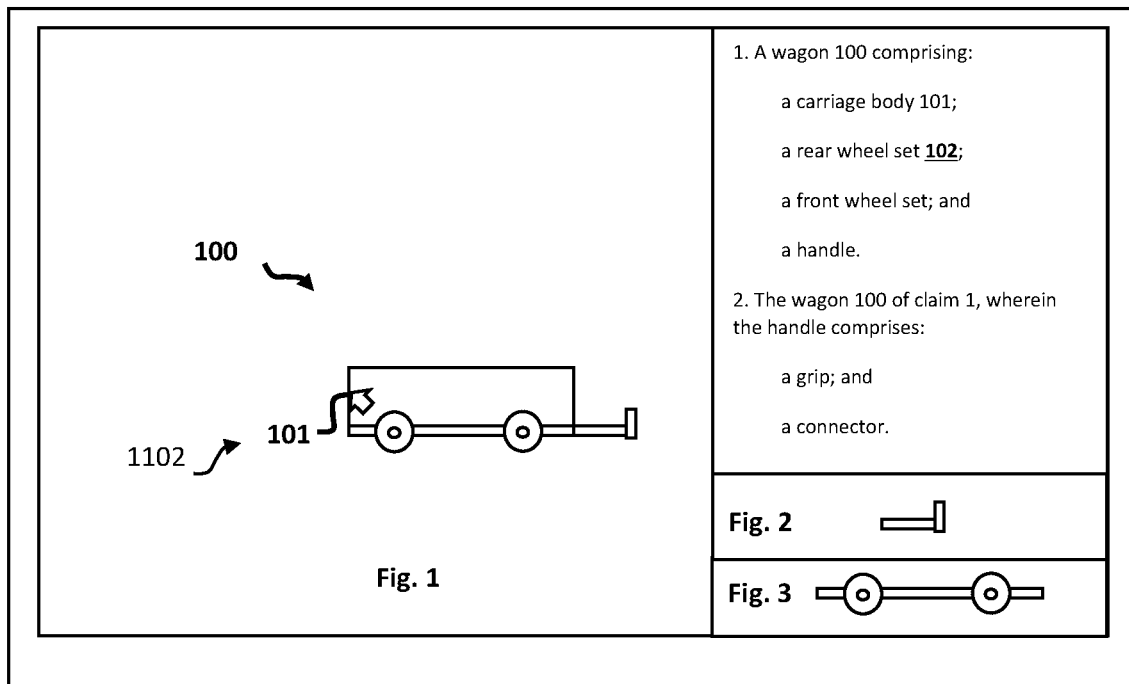
Figure 12:
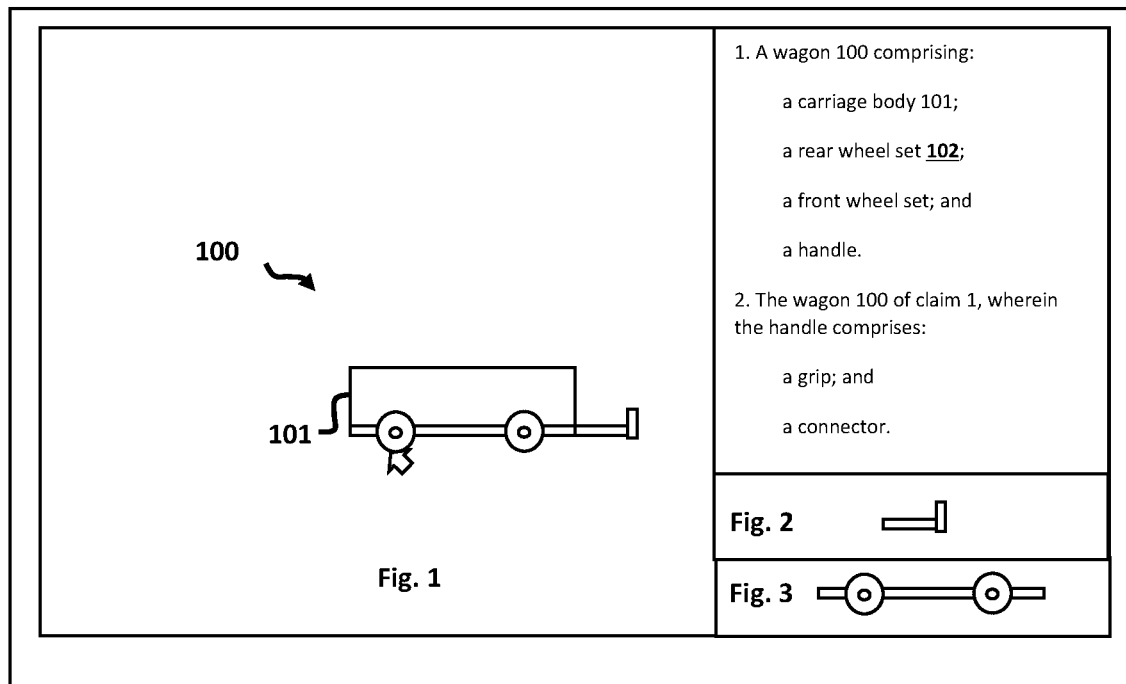
Figure 13:
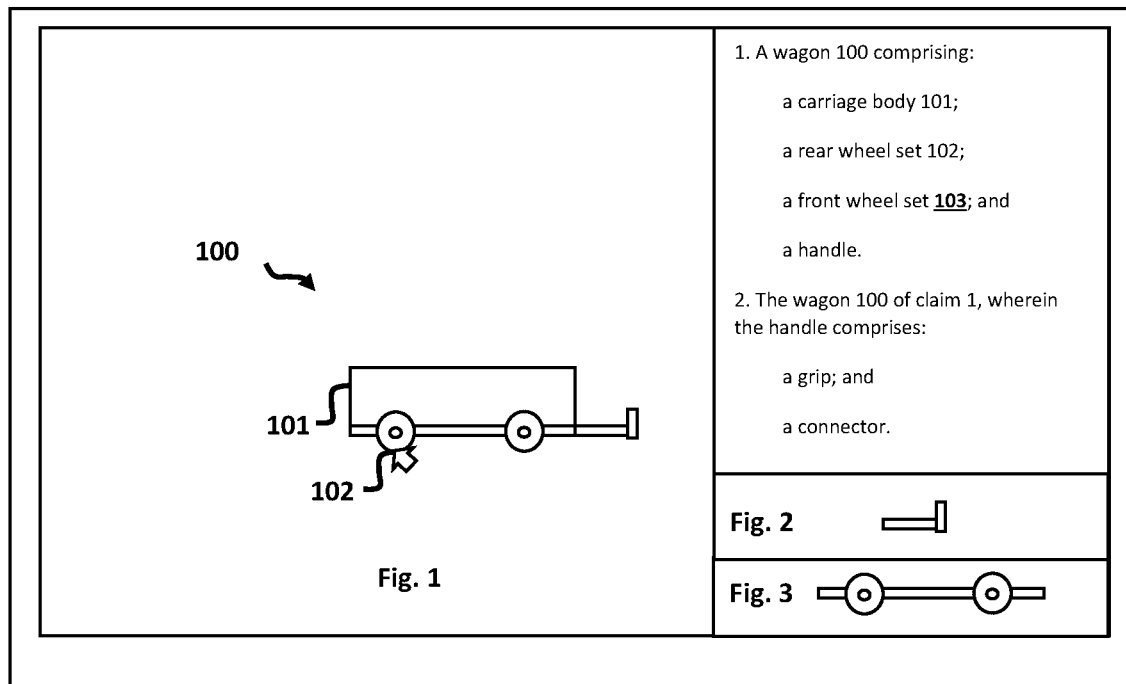
Figure 14:
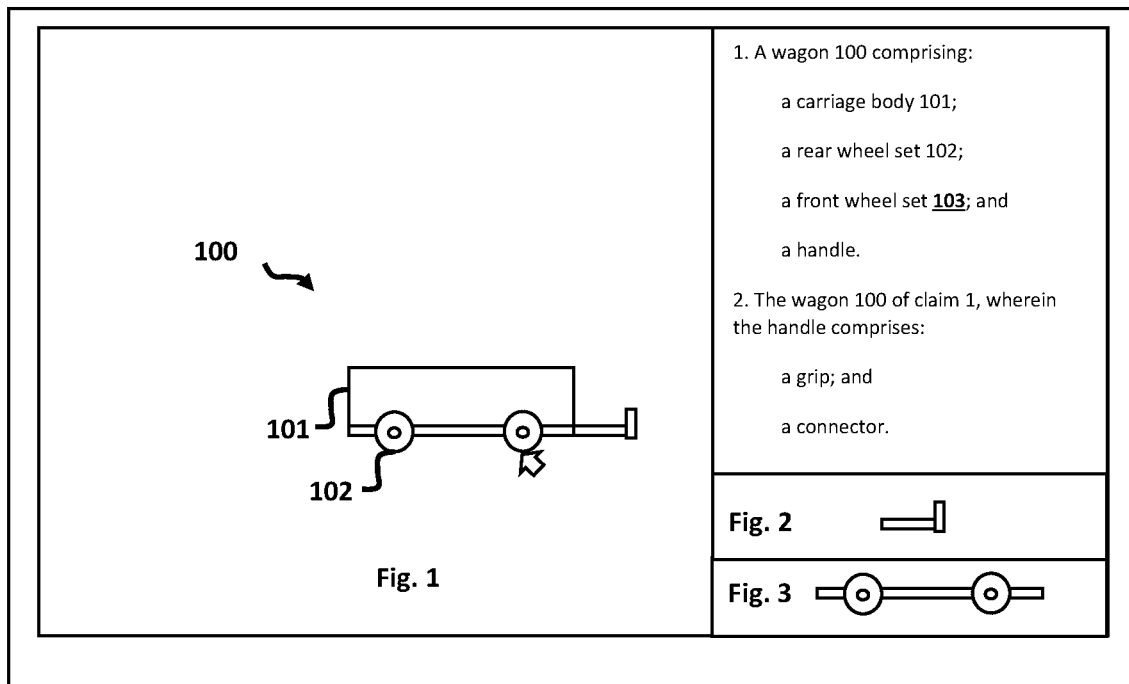
Figure 15:
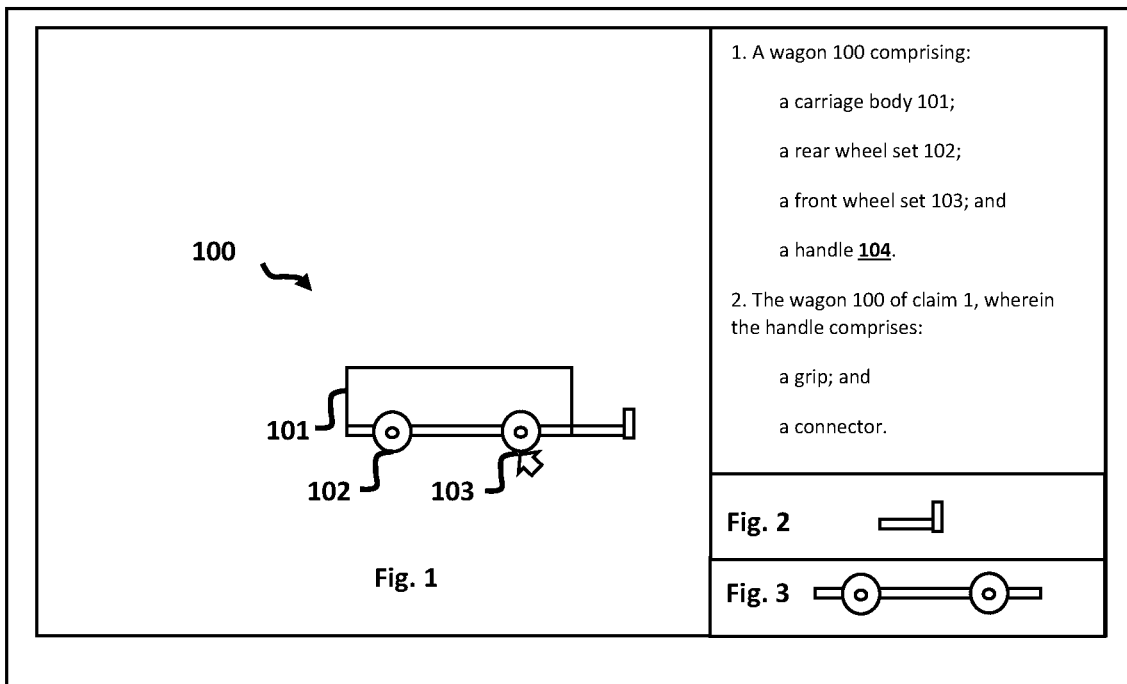
Figure 16:
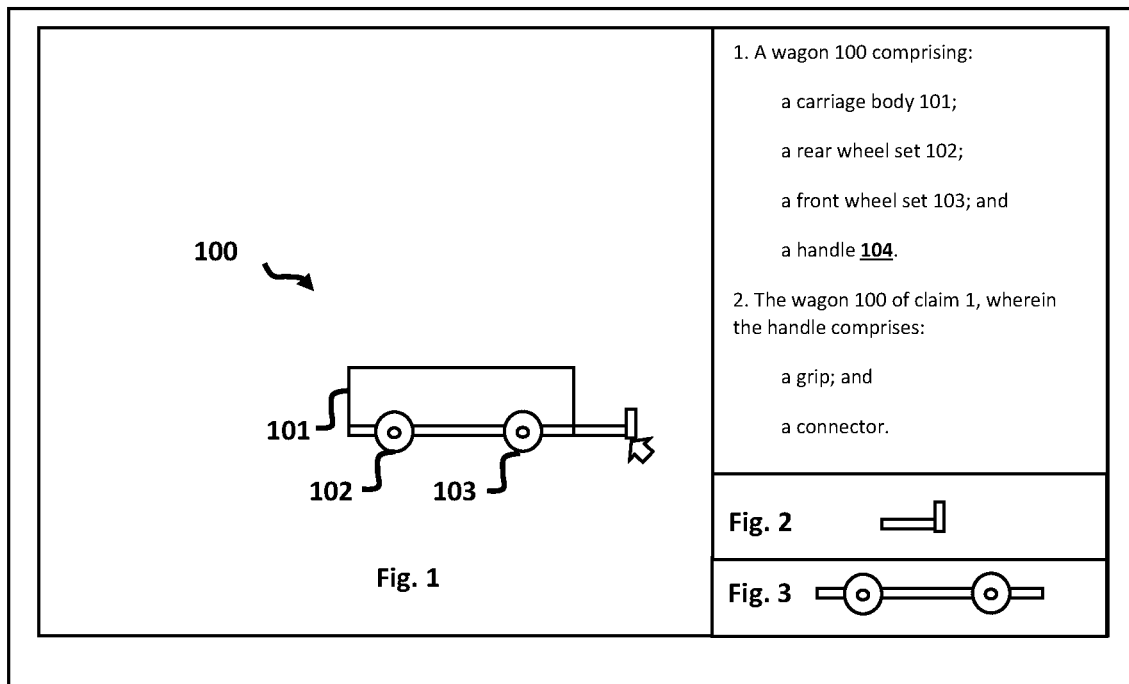
Figure 17:
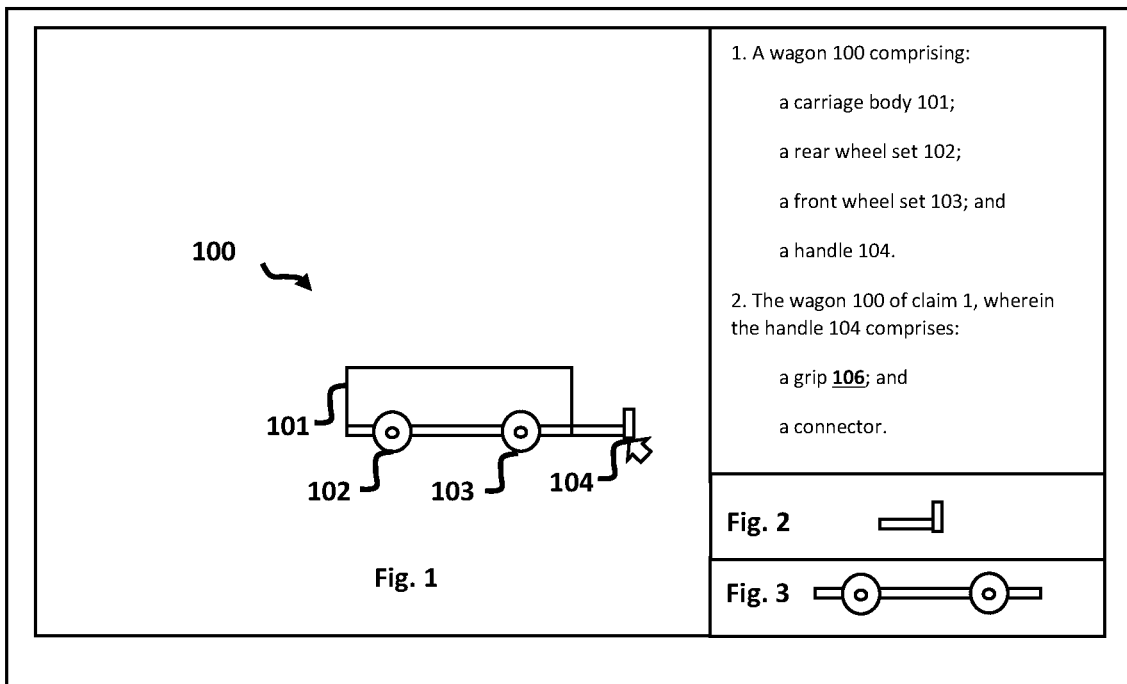

Similarly, changing a provisional label can be accomplished in many ways. An illustration of changing a provisional label to a specifically selected label is provided in FIG. 7 and FIG. 8. This specifically selected label 0516 could then be applied to the image 0502 instead of the provisional label 0512. To illustrate, the user can be given an opportunity to provide a label indication to identify a specifically selected label to be applied to the image. This could be done, for example, by allowing the user to select an image of a different label or portion of a different label. Examples of images displaying different labels or a portion of a different label are displayed in FIG. 5. Of course, other options are also available. For example, a user could press a key or combination of keys to identify a specifically selected label, and this could occur while a plurality of labels from which to select the specifically selected label is or is not displayed to the user on the image display. As an additional option, the user could be allowed to identify (e.g., by touching or using a mouse to click) any portion of a provisional label, and then identifying (e.g., by touching or using a mouse to click, optionally in combination with pressing another button or key) any portion of another label already appearing on the image or a plurality of images displayed on the image display.

An optional seventh step comprises receiving 0114 a label skip indication or a label indication (e.g., via a user clicking a mouse or pressing a key) from the user 0508 identifying the specifically selected label 0516 to be applied to the image 0502. Of course, anytime a label skip indication is received, the step of communicating to the user that a provisional label will be applied to the image can be repeated for a new provisional label along with any subsequent steps described herein. This new provisional label can optionally be selected the way any other provisional label is selected, for example, by indexing through a list of elements (e.g., unique elements or non-redundant elements) corresponding to elements appearing on an image. Then, when the indexing process results in the selection of a subsequent element in the list of elements, a symbolic designation can be included in the new provisional label, the symbolic designation corresponding to the subsequent element selected through the indexing process.

An eighth step comprises receiving 0116 a positional indication (e.g., via a user clicking a mouse or touching a touch pad or touch screen) from the user 0508 identifying the selected location on the image 0502. Illustrative examples of how a user can provide a positional indication are provided in FIG. 6, FIG. 10, FIG. 12, FIG. 14, FIG. 16, FIG. 19, FIG. 21, and FIG. 24.

An optional ninth step comprises adding 0118 a label (e.g., initial label, previously selected label, default label, or specifically selected label 0516) to the image 0502 at a location corresponding to the positional indication. As a skilled person would understand upon reading this disclosure, this step (or any other step described herein) can be performed immediately after receiving an indication, instruction or corresponding information from a user, although it could also occur at a later time and the indication, instruction or corresponding information from a user could simply be stored in memory. Illustrative examples of how a label can be added at a location corresponding to a positional indication are provided in FIG. 7, FIG. 11, FIG. 13, FIG. 15, FIG. 17, FIG. 20, FIG. 22, and FIG. 25.

Optionally the step of adding 0118 the label to the image 0502 is conducted so that a portion of the label (e.g., default portion or selected portion of the label) is positioned at the selected location, and optionally so that a portion of the label (e.g., any portion of a label described in this disclosure, any component of a label described in this disclosure, or portion of a component of a label described in this disclosure) is positioned at the selected location.

Figure 2:
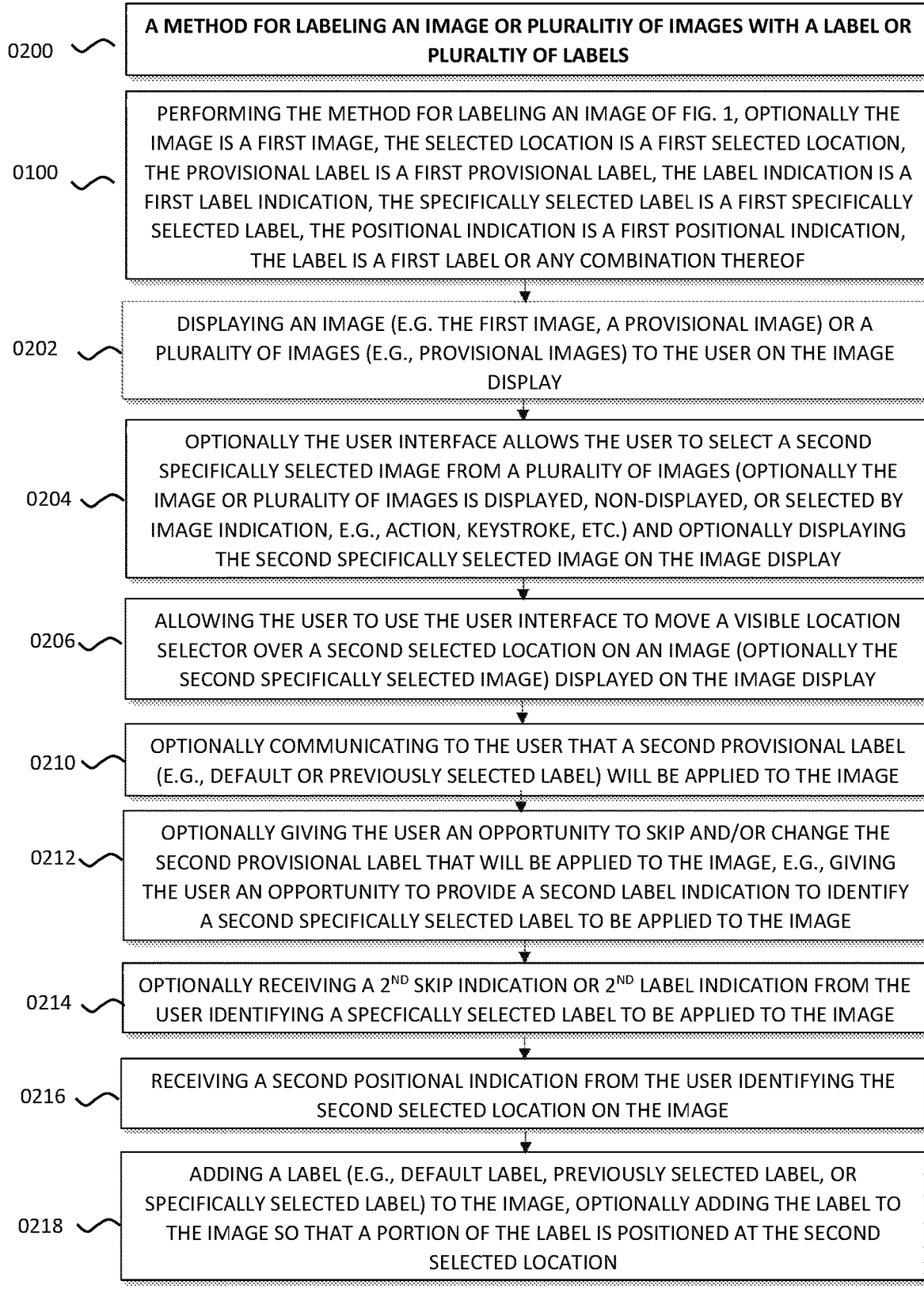
FIG. 2 depicts a schematic flow chart that illustrates an embodiment of a method for labeling an image or plurality of images with a label or plurality of labels.

With reference now to FIG. 2, a method 0200 for labeling an image 0502, 0504, 0506 will be described. As illustrated, the method can comprise several steps. It is worthwhile to note that some of these steps have already been described with reference to FIG. 1.

As illustrated, a first step comprises performing the method 0100 for labeling an image as described with reference to FIG. 1. Since the method 0200 described with reference to FIG. 2, can involve performing a second step or steps similar to a first step previously described with reference to the method 0100 and FIG. 1, every element described with reference to FIG. 1 or the first method 0100, can be considered a first element of the kind described. For example, the image can be a first image, the selected location can be a first selected location, the provisional label can be a first provisional label, the label indication can be a first label indication, the specifically selected label can be a first specifically selected label, the positional indication can be a first positional indication, the label can be a first label, or any combination thereof. Additionally, because the steps or a selection of steps can be performed any number of times in any order, subsequent performance of a step that has previously been performed can be given a name indicating that the step is one of several steps, for example, the name can include "subsequent," "additional," "second," "third," "fourth," "fifth," "sixth" or any other appropriate designation relating to number or order or both number and order.

A second step of the method 0200 comprises displaying 0202 an image 0502, 0504, 0506 (e.g., the first image, a provisional image, initial image, or default image) to the user 0508 on the image display 0510. This step can be equivalent to the displaying 0102 step described with reference to FIG. 1. For example, unless the user has selected a different image, the image displayed by the image display can remain unchanged relative to the image displayed during the method 0100 described with reference to FIG. 1.

Figure 26:
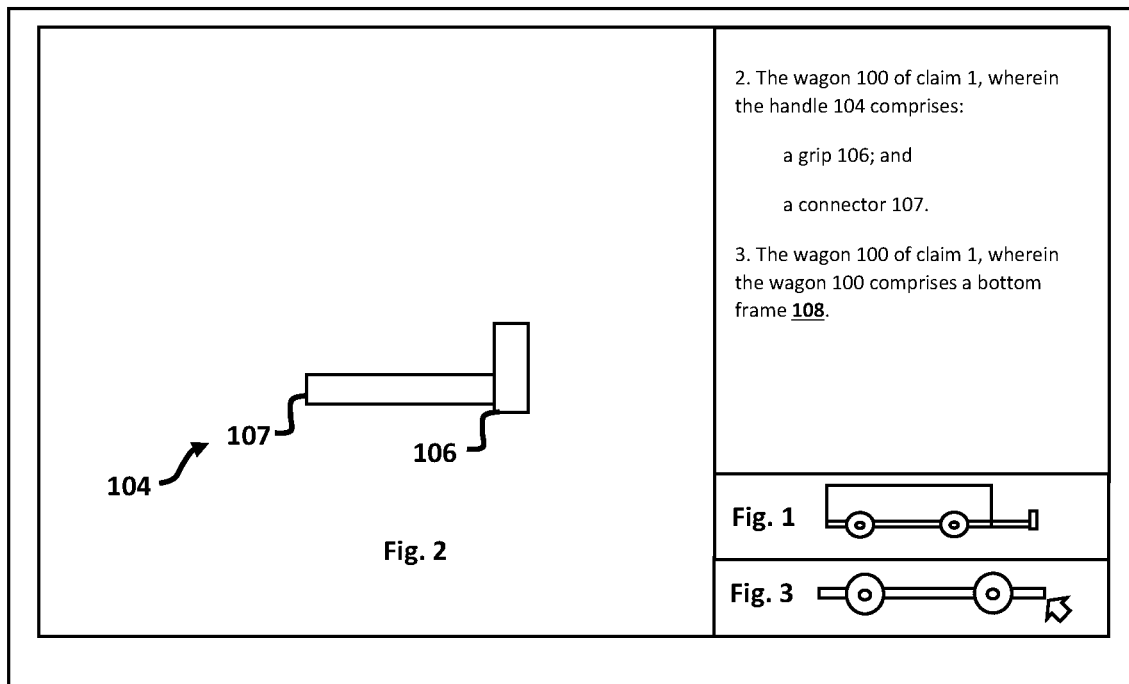
FIG. 26 depicts a schematic illustration which provides an example of how a system and method can be used to: display an image or a plurality of images to the user on the image display and permit the user to select a specifically selected image from a plurality of images, for example, by moving a mouse over a location corresponding to the specifically selected image and clicking the mouse once or by touching a touch screen at the location.

An optional third step of the method 0200 comprises allowing 0204 the user 0508 to select a second specifically selected image from a plurality of images. This step can be equivalent or analogous to the allowing portion of the providing step 0104 described with reference to FIG. 1. For example, allowing 0204 the user 0508 to select an image can be accomplished via providing an image indication according to any method of providing an indication described in this application. As illustrated in FIG. 18 and FIG. 19, the image (e.g., second image 0504) can be selected by using a mouse to click on the image. Additionally, FIG. 26 shows a location indicator (e.g., an arrow) being positioned over a third image 0506, which could also be selected.

A fourth step of the method 0200 comprises allowing 0206 the user 0508 to move a visible location selector 0602

(e.g. cursor or arrow) over a selected location on the image 0502, 0504, 0506 or plurality of images that is displayed on the image display 0510. An example of the visible location selector 0602 is provided in FIG. 19. Optionally, the user interface (e.g., an input device of the user interface) comprises a controller for the visible location selector 0602 that allows 0206 the user 0508 to move the visible location selector 0602 over a selected location on the image display. This step can be equivalent or analogous to the allowing 0106 step described with reference to FIG. 1.

Figure 20:
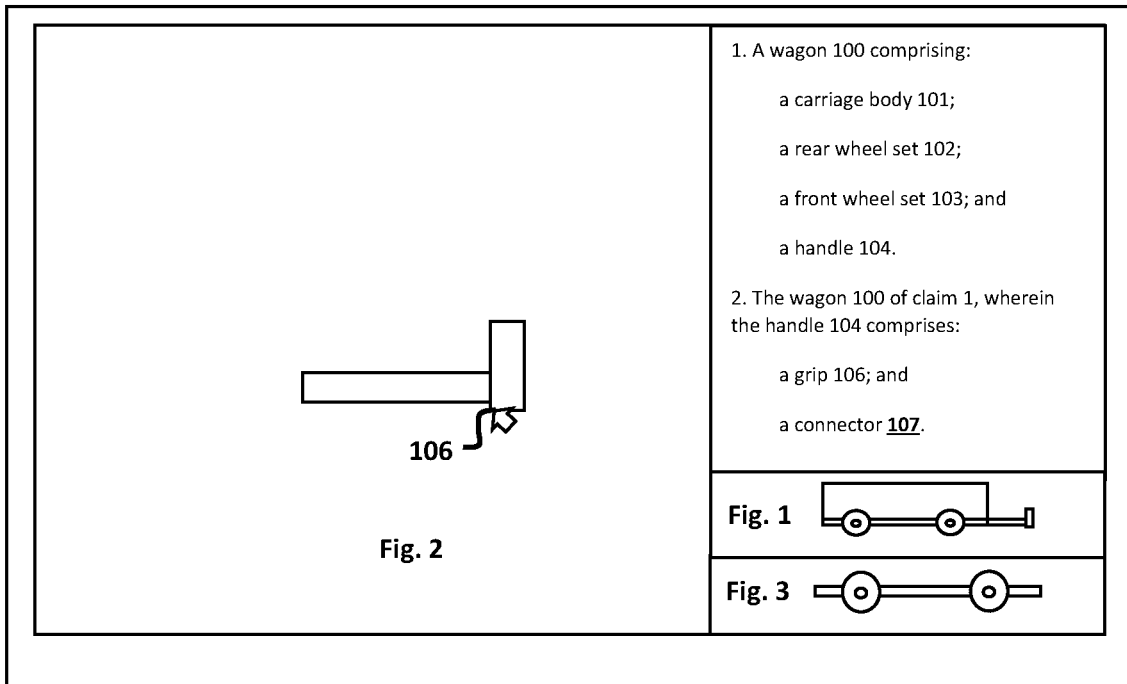
Figure 21:
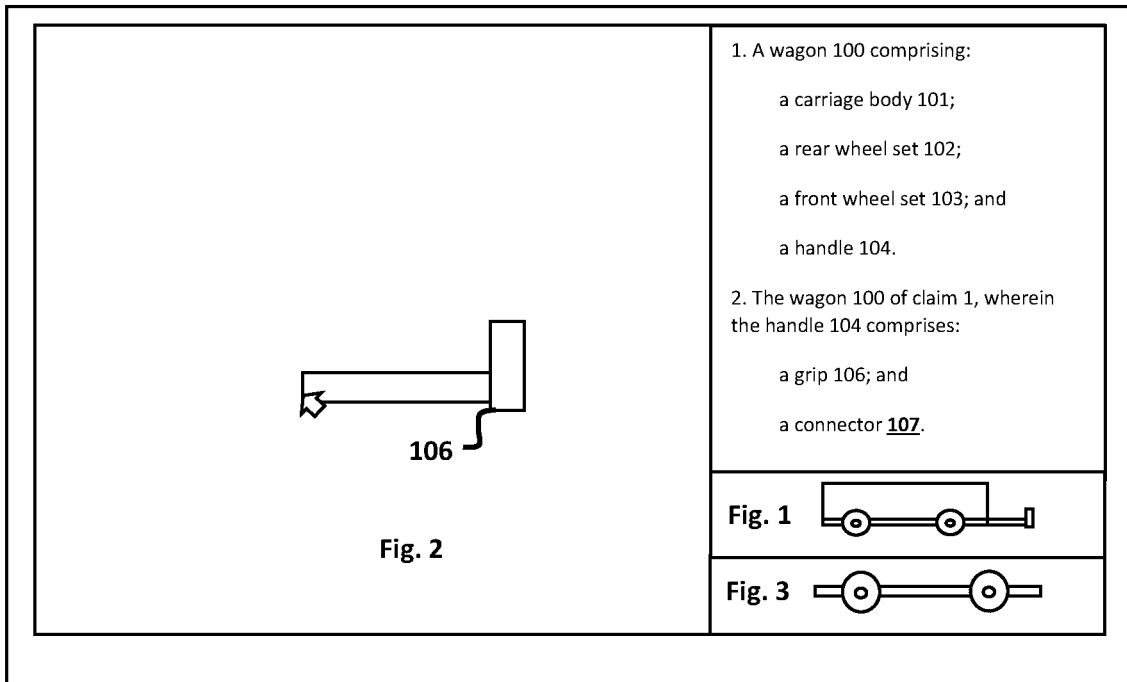
FIGS. 21-22 depict an ordered series of schematic illustrations which provide an example of how a system and method can be used to: permit a user to add a default label or a specifically selected label to a default image or a specifically selected image by taking an action to identify a location on the default image or the specifically selected image, for example, by moving a mouse over the location and clicking the mouse once or by touching a touch screen at the location.

An optional fifth step comprises communicating 0210 to the user 0508 that a second provisional label 0512 will be applied to the image 0502, 0504, 0506 before adding the label to the image 0502, 0504, 0506. An example of communicating 0110 to the user that a provisional label 0512 will be applied is provided in FIG. 18 in which the reference number "106" is underlined and bolded, thereby indicating that this reference number will appear in the next provisional label to be applied, as illustrated in FIG. 20. As a skilled person would understand, this step can actually occur at the same time as or after any of the first step, the second step, the third step, the fourth step, any step occurring before the application of the label, or any combination thereof. This step can be equivalent or analogous to the communicating 0110 step described with reference to FIG. 1.

An optional sixth step comprises giving 0212 the user 0508 an opportunity to skip applying a second provisional label 0512 or change a second provisional label 0512 (e.g., an initial label, previously selected label, or default label 1102) to a second specifically selected label 0516. This step can be equivalent or analogous to the giving 0112 step described with reference to FIG. 1.

Figure 22:
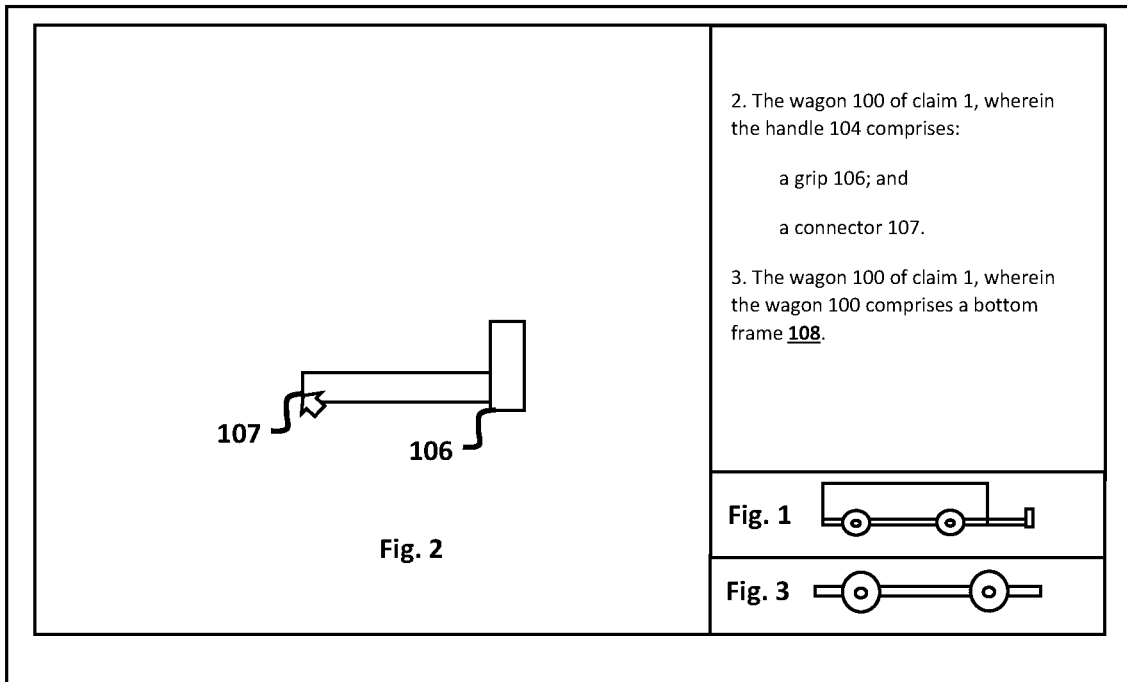

With respect to changing a provisional label, a skilled person reading the present disclosure would understand that this step can be accomplished in many ways. An illustration of changing a provisional label to a specifically selected label is provided in FIG. 22, FIG. 23, FIG. 24 and FIG. 25. For example, the last label applied in FIG. 22 is a label having a lead line without an arrow. The method and/or system have automatically advanced to a subsequent element ("a bottom frame") in the list of elements in the claims displayed on the image display 0510. This subsequent element ("a bottom frame") has not yet been added to the image or plurality of images to which symbolic designations (e.g., reference numbers) are being added. As can be seen, the method and/or system have automatically assigned the reference number "108" to the subsequent element ("a bottom frame") and indicated that this reference number will be included in the next provisional label (e.g., a default provisional label, an initial provisional label, a first provisional label a second provisional label, etc.) to be applied by highlighting and bolding the text of the reference number. Of course, rather than highlighting and bolding text, any other type of change in the text or background or highlighting could be used to designate that a symbolic designation (e.g., a reference number) will be included in the next provisional label to be applied to an image.

Figure 23:
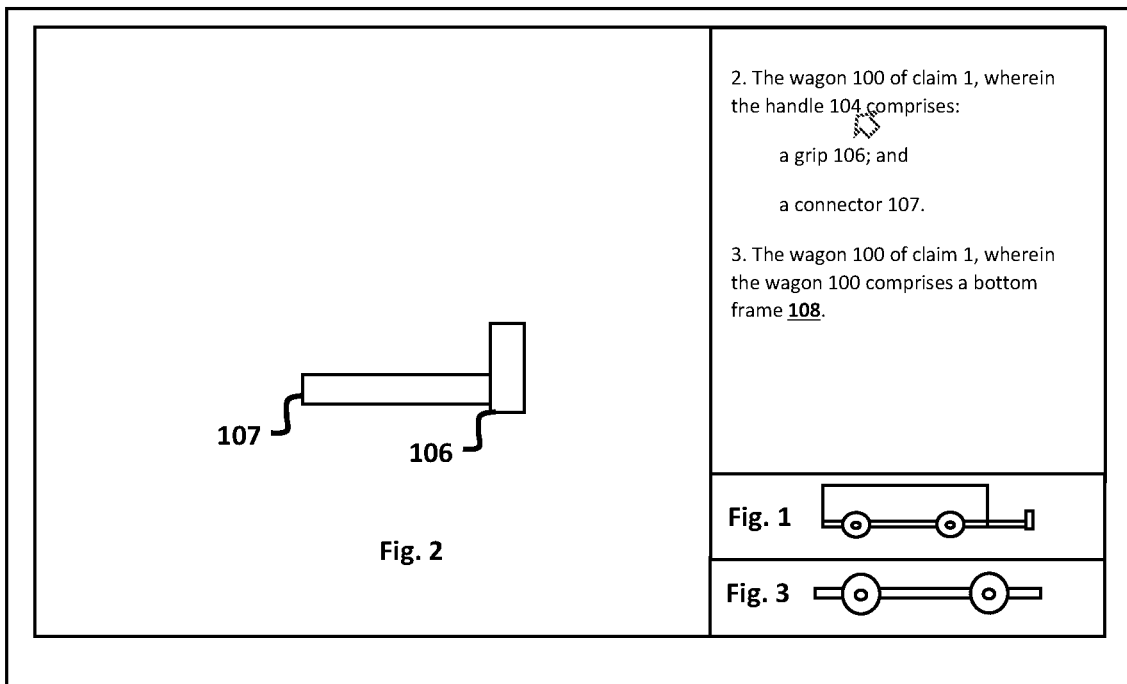
FIGS. 23-25 depict an ordered series of schematic illustrations which provide an example of how a system and method can be used to: communicate to a user that a default reference number will be applied to an image as part of a default label (e.g., FIG. 23); permit the user to select a reference number previously applied to the image or another image in a set of images from which the user can select images to which a label can be applied, thereby permitting the user to select a specifically selected reference number, for example, by using a mouse to move an arrow and click the mouse when the arrow is over or adequately close to the reference number or by touching the reference number or adequately close to the reference number on a touch screen (e.g., FIG. 23); communicate to a user that the specifically selected reference number will be applied to the image as part of a label (e.g., FIG. 24); permit the user to move an arrow to select a selected location where the system should locate the default label on the image (e.g., FIG. 24); locate the label at the selected location and optionally communicate to the user that a second reference number will be applied to the image as part of a second default label when the user identifies a second selected location for the second default label (e.g., FIG. 25).

However, as illustrated the method and/or system can give the user an opportunity to change the next provisional label to be applied. For example, as shown in FIG. 23, the user can use a mouse, touch pad or touch screen to move a positional indicator (e.g., an arrow) over a previously applied reference number and click a location on the image display corresponding to the previously applied reference number. As a result, the next label to be applied to an image can be changed to a label that includes the reference number "104."

Figure 24:
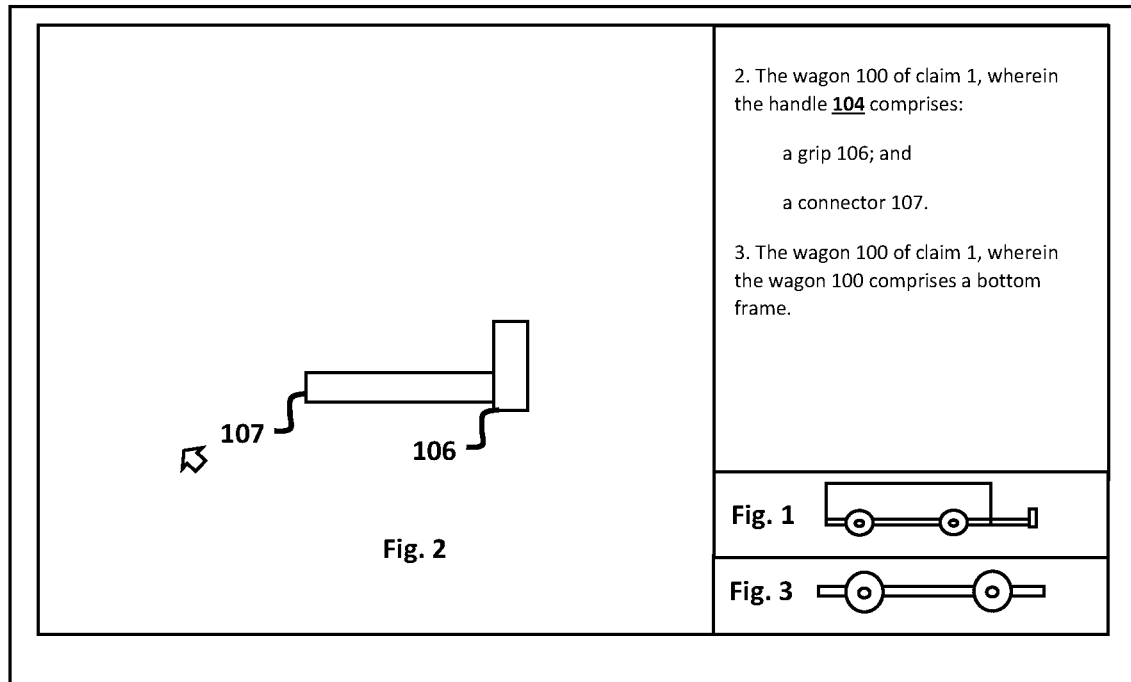
Figure 25:
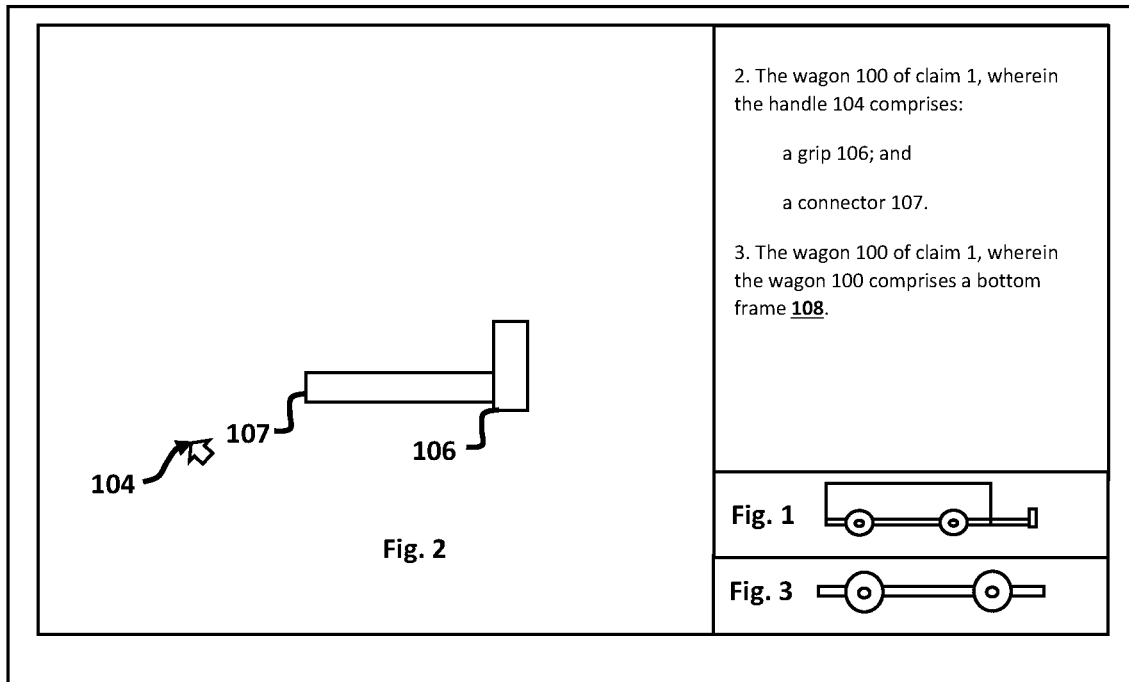

Since the previously applied label included a lead line without an arrow, the options for the method and/or system can be set so that the format of the previously applied label (e.g., a first label) will also be used for the next applied label (e.g., a second label). However, if desired, this can be changed using any approach described in this disclosure. With reference to FIG. 24, the lead line can be changed by providing a label indication (e.g., simply pressing a key or combination of keys, or a button) before or at the same time that the user gives the method and/or system a positional indication for the next label. To illustrate, if a default lead line for a label is a reference line without an arrow, by pressing a key labeled with the number "2" before or while using a mouse to click on a location where the next label should be applied to an image, the label applied can be changed so that it includes a lead line with an arrow, as illustrated in FIG. 25. Again, a skilled person reading this disclosure would understand that there are many different ways for a method and/or system to receive a positional indication or label indication and the specific examples provided are not intended to be limiting. As previously mentioned, the optional sixth step of giving 0212 the user 0508 an opportunity to skip applying or change a second provisional label 0512 can be equivalent or analogous to the giving step 0112 step described with reference to FIG. 1.

An optional seventh step comprises receiving 0214 a label skip indication (e.g., a second label skip indication) or a label indication (e.g., a second label indication). In the example illustrated in FIG. 22, FIG. 23, FIG. 24 and FIG. 25, the user did not skip application of the label so the method and/or system did not receive a label skip indication. However, the user did provide a label indication so that the method and/or system received the label indication. Looking merely at the example provided in FIG. 22, FIG. 23, FIG. 24 and FIG. 25, it may not be expressly evident whether the method and/or system previously received a label skip indication and/or a label indication; however, for purposes of the present example, it can be assumed that in some embodiments, a different or previous label skip indication and/or label indication was received by the method and/or system so that a second label skip indication and/or second label indication can also be received.

If a user does provide a label skip indication or a label indication so that the method and/or system receives a label skip indication or a label indication, the step or steps involved can be equivalent or analogous to the step of receiving 0114 a label skip indication or a label indication described with reference to FIG. 1.

An eighth step comprises receiving 0216 a second positional indication (e.g., via a user clicking a mouse or touching a touch pad or touch screen) from the user 0508 identifying the selected location on the image 0502, 0504, 0506. Illustrative examples of how a user can provide a positional indication are provided in FIG. 6, FIG. 10, FIG. 12, FIG. 14, FIG. 16, FIG. 19, FIG. 21, and FIG. 24. With reference again to the example illustrated in FIG. 22, FIG. 23, FIG. 24 and FIG. 25, the user can give a second positional indication (e.g., a new positional indication) to the method and/or system to indicate where a second label (e.g., the next label) comprising the reference number "104" should be applied. For example, the user can use a mouse or touch pad to reposition a positional indicator (e.g., an arrow) to a location where the second label (e.g., next label) comprising the reference number "104" should be applied, and then the user can click the mouse or touch pad; or if the image display comprises a touch screen, the user can directly touch the touch screen of the image display where the second label (e.g., the next label) comprising the reference number "104" should be applied.

Additionally, the eighth step can be equivalent or analogous to the step of receiving 0116 a positional indication described with reference to FIG. 1.

An optional ninth step comprises adding 0218 a second label (e.g., next label, initial label, previously selected label, default label, or specifically selected label 0516) to the image 0502, 0504, 0506 at a second selected location corresponding to the second positional indication. The step of adding 0218 a second label can be equivalent or analogous to the step of adding 0118 a label described with reference to FIG. 1. Furthermore, it is possible that the second label added to an image 0502, 0504, 0506 is identical to the first label added to an image (e.g., initial label, previously selected label, default label, or specifically selected label 0516).

Optionally the step of adding 0218 the second label to the image 0502, 0504, 0506 is conducted so that a portion of the second label (e.g., default portion or selected portion of the label) is positioned at the second selected location, and optionally so that a portion of the label (e.g., any portion of a label described in this disclosure, any component of a label described in this disclosure, or portion of a component of a label described in this disclosure) is positioned at the second selected location.

Additional Embodiments

The following clauses are provided as further description of the present disclosure:

1. A method 0100, 0200 (e.g., for adding a label to an image 0502, optionally the image comprising at least one element, for adding at least one label (e.g. a label or a plurality of labels) to at least one image, optionally each image in the at least one image comprising at least one element, or any combination thereof), the method comprising:
    optionally receiving an image 0502 or a plurality of images comprising an image from a user 0508;
    optionally displaying 0102, 0202 an image 0502 (e.g., the image, a default image 0502, a preliminary image 0502, a provisional image 0502, a previously selected image 0502, a specifically selected image 0502, a first image 0502, a second image 0504, or a third image 0506) to a user 0508 (e.g., the user) on an image display 0510 (e.g., monitor, phone screen, computer 0312 screen, tablet computer 0312 screen, touch screen, holographic display, heads up display, glasses, headset, virtual reality headset or any combination thereof);
    optionally the user display being a component of a user interface, the user interface being a component of a system, the system comprising the user interface and a computer, optionally the user interface comprising at least one input device, optionally the at least one input device comprising a controller configured to control the visible location selector;
        optionally, the displaying 0102, 0202 the image 0502 occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;
    optionally providing 0104, 0204 a user interface 0300;
    optionally the providing 0104, 0204 a user interface 0300 occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;
    optionally allowing the user to select (e.g., using the system, the computer, the user interface, a combination thereof, or a component thereof) a specifically selected image from a plurality of images, the first image being the specifically selected image;
    optionally a system used to perform the method (e.g., the computer, the user interface 0300 or a combination thereof) allows the user 0508 to select a specifically selected image (e.g., image 0502) from a plurality of images (e.g., images 0502, 0504, 050);
    optionally the specifically selected image (e.g., image 0502) or plurality of images (e.g., images 0502, 0504, 0506) is displayed or non-displayed;
    optionally the specifically selected image is selected by image indication (e.g., an action, interaction, indication, a user 0508 clicking a mouse 0310, a user 0508 touching a screen, a user 0508 illuminating a location with a laser, a user 0508 moving the body or portion of a body of the user, a user 0508 making a hand motion, a user 0508 moving an eye or eyes, a user 0508 blinking an eye or eyes, a user 0508 making a noise, a user 0508 speaking a word, receiving information from an electrophysiological monitor of the user's 0508 brain activity or thoughts, a user making a sound whether directly or indirectly, or any combination thereof);
    optionally, displaying the specifically selected image on the image display 0510;
    optionally a system used to perform the method (e.g., the computer, the user interface 0300 or a combination thereof) allows 0106, 0206 the user 0508 (e.g., human, artificial intelligence, program, controller, or any combination thereof) to move a visible location selector 0602 (e.g. cursor or arrow or any other location selector, which can appear on the image display 0510 with the image) over a selected location (e.g., first selected location, second selected location or third selected location) on an image 0502 (e.g., first image 0502, second image 0504, third image 0506, figure of a patent application, drawing, etc.) or plurality of images (e.g., images 0502, 0504, 0506) that is displayed on the image display 0510 and identify the selected location, optionally the user interface 0300 comprising the image display 0510 (e.g., monitor, touchscreen), a controller for a visible location selector (e.g., a controller, a controller for a cursor, a controller for an arrow, a mouse 0310, a joystick, a key, a keyboard 0306, a touch pad, a touch screen, a sensor to detect movement of a user, or any combination thereof) a keyboard 0306, a sound detector 0308 (e.g., microphone), a sound maker 0304 (e.g., speaker), a virtual reality system 0302, a virtual reality headset, a head mounted display, a sensor, a vibrator, a robot, a light detector 0324 (e.g., camera), or any combination thereof, optionally the user interface (e.g., an input device of the user interface) comprises a controller for the visible location selector 0602 (or any component of user interface described in this disclosure) that allows 0106, 0206 the user 0508 to move the visible location selector 0602 over a selected location and identify the selected location;

optionally, the providing 0104, 0204 a user interface 0300 occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally receiving 0116 a positional indication (e.g., first positional indication, second positional indication, third positional indication, indication via a user positioning a visible location selector (e.g., cursor or arrow or any other location selector, which can be displayed on the image display, for example, with the image), indication via a user interacting with the user interface or any component or components of the user interface described in this disclosure, indication via a user 0508 clicking a mouse 0310, indication via a user 0508 touching a screen, indication via a user 0508 illuminating a location with a laser, indication via a user 0508 moving a body, indication via a user 0508 making a hand motion, indication via a user 0508 moving an eye or eyes, indication via a user 0508 blinking an eye or eyes, indication via a user 0508 making a noise, indication via a user 0508 speaking a word, receiving information from an electrophysiological monitor of the user's 0508 brain activity or thoughts, or any combination thereof) from the user 0508 identifying the selected location on the image 0502;

optionally the receiving 0116 a positional indication occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally adding 0118 a label (e.g., a first label 0512, second label 1102, third label, initial label, previously selected label, default label, specifically selected label 0516) to the image 0502 at a location corresponding to the positional indication (e.g., corresponding to the selected location);

optionally adding 0118 the label (e.g., a first label 0512, second label 1102, third label, initial label 0512, previously selected label 0512, default label 0512, specifically selected label 0516) to the image 0502 so that a portion of the label (e.g., first end of a lead line adjacent to a symbolic designation 0702, for example a reference number, second end of a lead line opposite a symbolic designation 0702, a tip of an arrow of a lead line, an open end of a bracket, the closed end of a bracket, a pointed portion of the closed end of a bracket, or any combination thereof) is positioned at the selected location, optionally so that a portion of the label (e.g., any portion of a label described in this disclosure, any component of a label described in this disclosure, or portion of a component of a label described in this disclosure) is positioned at the selected location;

optionally the adding 0118 the label occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally displaying a first image to a user on an image display, the image display being a component of a user interface, the user interface configured to allow the user to move a visible location selector over a first selected location on the first image and identify the first selected location;

optionally receiving a first positional indication from the user identifying the first selected location on the first image;

optionally adding a first label to the first image at a first location corresponding to the first positional indication, the first label comprising a first symbolic designation to identify a first element of the at least one element of the first image, the first symbolic designation for the first label being generated (i) by a system comprising the user interface (e.g., generated automatically by the system), (ii) without the user fully specifying the first symbolic designation, (iii) without the user partially specifying the first symbolic designation, or (iv) any combination thereof;

or any combination thereof.

2. The method 0100, 0200 of any preceding clause, comprising:

optionally, communicating 0110, 0210 to the user 0508 that a provisional label 0512 (e.g., the label, the first label 0512, an initial label, previously selected label or default label) will be applied to the image 0502 before adding the label (e.g., in the form of the provisional label) to the image 0502;

optionally, communicating 0110, 0210 to the user 0508 that a provisional label 0512 (e.g., the label the first label 0512, an initial label, previously selected label or default label) will be applied to the image 0502 before receiving the positional indication from the user 0508 identifying the selected location on the image 0502;

optionally, wherein the communicating 0110, 0210 to the user 0508 that the provisional label 0512 will be applied to the image 0502 comprises displaying, making a noise, vibrating, moving, performing an action that can be perceived by a sense of touch, taste, smell, sound, or sight, performing an action that can be perceived by a human user 0508, performing an action that can be perceived by a machine, performing an action to affect a machine, performing an action to cause an intended effect on a machine, sending a signal, sending an electronic signal, sending a pneumatic signal, displaying the label 0512 that will be applied to the image 0502, displaying a portion of the label 0512 that will be applied to the image, displaying a location indicator 0704 that will be applied to the image, displaying a corresponding symbolic designation 0702 (e.g., word, claim element, name, part number) that corresponds to a location (e.g., the selected location) on the image 0502, or any combination thereof;

optionally the communicating 0110, 0210 to the user 0508 that the provisional label 0512 will be applied to the image 0502 occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally giving 0112, 0212 the user 0508 an opportunity to skip or change a provisional label 0512 (e.g., the label, the first label 0512, an initial label, previously selected label, default label, a second label 1102, second provisional label 1102 or a combination thereof) that will be applied to the image 0502 before adding the label to the image 0502;

optionally giving 0112, 0212 the user 0508 an opportunity to skip a provisional label 0512 (e.g., the label, the first label 0512, an initial label, previously selected label, default label, a second label 1102, second provisional label 1102 or a combination thereof) that will be applied to the image 0502 before adding the label to the image 0502;

optionally receiving an instruction to skip the provisional label 0512, for example, via the user pressing a key, a plurality of keys, or a mouse button, or via using a mouse to identify a selected element different from the element corresponding to the provisional label 0512, the selected element being, for example, from a list of elements (e.g., elements recited in a patent claim) that correspond to elements in an image (e.g., a patent figure) or a plurality of images comprising the image;

optionally giving 0112, 0212 the user 0508 an opportunity to change a provisional label 0512 (e.g., the label, the first label 0512, an initial label, previously selected label, default label, a second label 1102, second provisional label 1102 or a combination thereof) that will be applied to the image 0502 before adding the label to the image 0502;

optionally giving 0112, 0212 the user 0508 an opportunity to change a provisional label 0512 (e.g., the label, the first label 0512, an initial label, previously selected label, default label 1102, a second label, second provisional label 1102 or a combination thereof) to a specifically selected label 0516 (e.g., by giving the user an opportunity to provide a label indication);

optionally giving 0112, 0212 the user 0508 an opportunity to change the provisional label 0512 occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally giving the user an opportunity to change the first label to a first specifically selected label by giving the user an opportunity to provide a first label indication after the first label is applied to the first image;

optionally, the label indication comprising: (i) allowing the user to change the first symbolic designation of the first label to a specifically selected symbolic designation, (ii) allowing the user to change the first location indicator to a specifically selected location indicator, (iii) allowing the user to change the position of the first symbolic designation of the first label, (iv) allowing the user to change the position of the first location indicator of the first label, or (v) any combination thereof;

optionally giving 0112, 0212 the user 0508 an opportunity to provide a label indication (e.g., first label indication, second label indication, third label indication, indication via a user 0508 clicking a mouse 0310, indication via a user 0508 touching a screen, indication via a user 0508 illuminating a location with a laser, indication via a user 0508 moving a body, indication via a user 0508 making a hand motion, indication via a user 0508 moving an eye or eyes, indication via a user 0508 blinking an eye or eyes, indication via a user 0508 making a noise, indication via a user 0508 speaking a word, receiving information from an electrophysiological monitor of the user's 0508 brain activity or thoughts, or any combination thereof) to identify a specifically selected label 0516 to be applied to the image 0502;

optionally the label indication can comprise the user identifying (e.g., using a mouse to click on) a provisional symbolic designation (e.g., a provisional reference number, which can be displayed on the image display, for example, with the image) and providing (e.g., typing) a selected symbolic designation to replace the provisional symbolic designation, optionally the selected symbolic designation does not already appear in a set of symbolic designations corresponding to a list of elements (e.g., elements recited in a patent claim), which list of elements corresponds to elements in an image (e.g., a patent figure) or a plurality of images comprising the image, optionally the selected symbolic designation does already appear in a set of symbolic designations corresponding to a list of elements (e.g., elements recited in a patent claim), which list of elements corresponds to elements in an image (e.g., a patent figure) or a plurality of images comprising the image;

optionally the label indication can comprise giving the user an opportunity to change the name of a specific element corresponding to a provisional symbolic designation so that the specific element has the name of any element in the list of elements corresponding to the selected symbolic designation;

optionally the label indication can comprise the user identifying (e.g., touching or using a mouse to click on) any portion of a label (e.g., provisional label) described herein and appearing anywhere on the image display (e.g., in a list or on an image) and then the user identifying (e.g., touching or using a mouse to click, optionally in combination with pressing another key) any portion of a different label described herein and appearing in a list or an image anywhere on the image display, thereby changing the label (e.g., provisional label) so that the portion of the label (e.g., provisional label) is changed to match the portion of the different label;

optionally the giving 0112, 0212 the user 0508 an opportunity to provide a label indication occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally receiving 0114, 0214 a label indication (e.g., first label indication, second label indication, third label indication, indication via a user 0508 clicking a mouse 0310, indication via a user 0508 touching a screen, indication via a user 0508 illuminating a location with a laser, indication via a user 0508 moving a body, indication via a user 0508 making a hand motion, indication via a user 0508 moving an eye or eyes, indication via a user 0508 blinking an eye or eyes, indication via a user 0508 making a noise, indication via a user 0508 speaking a word, receiving information from an electrophysiological monitor of the user's 0508 brain activity or thoughts, or any combination thereof) from the user 0508 identifying the specifically selected label 0516 (e.g., first label, second label, third label, second specifically selected label or any combination thereof) to be applied to the image 0502;

optionally the receiving 0114, 0214 a label indication occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally adding 0118 a label (e.g., a first label 0512, second label 1102, third label, initial label 0512, previously selected label 0512, default label 0512, the user specifically selected label 0516) to the image 0502, for example, in accordance with the label indication;

optionally the adding 0118 a label occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally allowing the user to use the user interface to select a specifically selected image from a plurality of images, the first image being the specifically selected image;

optionally communicating to the user that a first provisional label will be applied to the first image before receiving the first positional indication from the user and before adding the first label, in the form of the first provisional label, to the image;

optionally giving the user an opportunity to change the first provisional label to a first specifically selected label by giving the user an opportunity to provide a first label indication, the first label being the first specifically selected label;

optionally the first image being a first figure for a patent application, the first symbolic designation being a first alphanumeric designation;

optionally the first image being a first figure for a patent application, the first symbolic designation being a first reference number corresponding to a first element recited in a claim of the patent application;

optionally the first label comprising a first location indicator to indicate the location on the first image of the first element corresponding to the first label, and the first location indicator for the first label being generated (i) by a computer automatically or (ii) without the user fully specifying the location indicator;

optionally giving the user an opportunity to change the first label to a first specifically selected label by giving the user an opportunity to provide a first label indication after the first label is applied to the first image;

optionally the label indication comprising: (i) allowing the user to change the first symbolic designation of the first label to a specifically selected symbolic designation, (ii) allowing the user to change the first location indicator to a specifically selected location indicator, (iii) allowing the user to change the position of the first symbolic designation of the first label, (iv) allowing the user to change the position of the first location indicator of the first label, or (v) any combination thereof;

optionally displaying the plurality of images on the image display.

optionally the method comprising:

a. optionally communicating to the user that a first provisional label will be applied to the first image before receiving the first positional indication from the user and before adding the first label, in the form of the first provisional label, to the first image; and optionally after the step of adding the first label, the method comprising the steps:

a. communicating to the user that a second provisional label will be applied to the first image before receiving a second positional indication from the user and before adding a second label, in the form of the second provisional label, to the first image;

b. receiving the second positional indication from the user identifying the second selected location on the first image;

c. adding the second label to the first image at a second location corresponding to the second positional indication, the second label comprising a second symbolic designation to identify a second element of the at least one element of the first image, the second symbolic designation for the second label being generated (i) by the system (e.g., automatically), (ii) without the user fully specifying the symbolic designation, (iii) without the user partially specifying the symbolic designation, or any combination thereof;

d. or any combination thereof;

optionally the second symbolic designation for the second label being generated by selecting four digits in a four-digit number, the first two digits in the four-digit number corresponding to a figure number of the first image, the figure number being a two-digit integer from 00 to 99, and the second two digits in the four-digit number corresponding to a reference number for the second element, the reference number being a two-digit integer from 00 to 99, and the reference number being automatically generated by starting with 00 and counting by a specified integer (e.g., 1, 2, 3, 4, 5, 6, 7, 8, 9 or 10) until arriving at a two-digit integer that has not yet been assigned to an element of the first image;

optionally the first symbolic designation for the first label being automatically generated by the system, the system assigning the four-digit number 0100 as the first symbolic designation;

optionally the second symbolic designation for the second label being automatically generated by the system, the system assigning the four-digit number 0101 as second symbolic designation;

or any combination thereof.

3. The method 0100, 0200 of any preceding clause, the method 0100, 0200 comprising:

optionally providing 0104, 0204 a system, a computer, a user interface 0300 (or any component of a user interface described in this disclosure or combination of components of a user interface described in this disclosure) or any combination thereof or any component thereof that allows the user 0508 (e.g., human, artificial intelligence, program, controller, or any combination thereof) to select a specifically selected image 0502 from a plurality of images 0502, 0504, 0506 before the step of receiving 0116 the positional indication from the user 0508 identifying the selected location on the image 0502 (e.g., default image 0502, preliminary image 0502, provisional image 0502, previously selected image 0502, specifically selected image 0502, a first image 0502, second image 0504, or third image 0506), and before adding a label (e.g., a first label 0512, second label 1102, or third label) to the image 0502 (e.g., default image 0502, preliminary image 0502, provisional image 0502, previously selected image 0502, specifically selected image 0502, a first image 0502, second image 0504, or third image 0506), optionally wherein a component of a system, a computer, the user interface (e.g., any component of a user interface described herein) or any combination thereof allows the user 0508 to select the specifically selected image 0502 from the plurality of images 0502, 0504, 0506 before the step of receiving 0116 the positional indication from the user 0508 identifying the selected location on the image 0502, and before adding the label to the image 0502;

optionally providing 0104, 0204 system, a computer, a user interface 0300 (or any component of a user interface described in this disclosure or combination of components of a user interface described in this disclosure), any combination thereof, or any component thereof that allows 0106, 0206 the user 0508 (e.g., human, artificial intelligence, program, controller, or any combination thereof) to move a visible location selector 0602 (e.g. arrow or cursor) over a specifically selected image 0502 (e.g., default image 0502, preliminary image 0502, provisional image 0502, previously selected image 0502, specifically selected image 0502, a first image 0502, second image 0504, or third image 0506) that is displayed on the image display 0510 and identify the specifically selected location;

optionally the providing 0104, 0204 a user interface 0300 occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally a system, the computer, the user interface, any combination thereof or any component thereof allows 0204 the user 0508 to select a second specifically selected image (e.g., image 0504) from a plurality of images (e.g., images 0502, 0504, 0506);

optionally the second specifically selected image (e.g., image 0502) or plurality of images (e.g., images 0502, 0504, 0506) is displayed or non-displayed;

optionally the second specifically selected image (e.g., image 0504) is selected by a second image indication (e.g., an action, interaction, indication, a user 0508 clicking a mouse 0310, a user 0508 touching a screen, a user 0508 illuminating a location with a laser, a user 0508 moving the body or portion of a body of the user, a user 0508 making a hand motion, a user 0508 moving an eye or eyes, a user 0508 blinking an eye or eyes, a user 0508 making a noise, a user 0508 speaking a word, receiving information from an electrophysiological monitor of the user's 0508 brain activity or thoughts, a user making a sound whether directly or indirectly, or any combination thereof);

optionally displaying the second specifically selected image on the image display 0510;

optionally receiving 0204 an image indication (e.g., first image indication, second image indication, third image indication, indication via a user 0508 clicking a mouse 0310, keystroke, indication via a user 0508 touching a screen, indication via a user 0508 illuminating a location with a laser, indication via a user 0508 moving a body, indication via a user 0508 making a hand motion, indication via a user 0508 moving an eye or eyes, indication via a user 0508 blinking an eye or eyes, indication via a user 0508 making a noise, indication via a user 0508 speaking a word, receiving information from an electrophysiological monitor of the user's 0508 brain activity or thoughts, or any combination thereof) from the user 0508 identifying the specifically selected image 0502 (e.g., second specifically selected image);

optionally the receiving 0204 an image indication occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally adding a label (e.g., a first label 0512, second label 1102, third label, previously selected label, default label, specifically selected label) to the image 0502;

optionally the adding a label occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof; or any combination thereof.

4. The method 0100, 0200 of any preceding clause:

optionally wherein the label 0512 comprises a symbolic designation 0702, for example, to identify an element (e.g., of the at least one element of the image) to which the label corresponds;

optionally the symbolic designation is an initial symbolic designation, a default symbolic designation;

optionally the symbolic designation is generated by the method and/or a system performing the method, or a step or component thereof (e.g., the computer);

optionally the label is generated without any user input specifying (e.g., fully specifying or partially specifying) the label, without any user input specifying the label apart from providing rules or preferences for how the label should be generated, without user input that fully specifies the label, without requiring user input that specifies (e.g., partially specifies or fully specifies) the label between (i) the step of displaying the image to the user or the step of communicating a provisional label to the user and (ii) the step of adding the label to the image, or any combination thereof;

optionally the symbolic designation is generated without any user input specifying (e.g., fully specifying or partially specifying) the symbolic designation, without any user input specifying the symbolic designation apart from providing rules or preferences for how the symbolic designation should be generated, without user input that fully specifies the symbolic designation, without requiring user input that specifies (e.g., partially specifies or fully specifies) the symbolic designation between (i) the step of displaying the image to the user or the step of communicating a provisional label to the user and (ii) the step of adding the label to the image, or any combination thereof;

optionally wherein the symbolic designation 0702 comprises a punctuation mark, an accent, a diacritical mark, a cross, a dagger, a shape (e.g., circle, square, point, line, rectangle, triangle, pentagon, hexagon, or any combination thereof), an alphanumeric designation (e.g., number, integer, real number, numeral, numerals, letter, letters, or any combination thereof), or any combination thereof;

optionally wherein the alphanumeric designation comprises a numeric designation (e.g., number, numeral, numerals, or any combination thereof);

optionally wherein the alphanumeric designation comprises an alphabetic designation (e.g., word, words, letter, letters or any combination thereof);

optionally the symbolic designation being a reference number, at least one reference letter, or alphanumeric designation corresponding to an element recited in a claim of the patent application;

optionally wherein the label comprises a location indicator 0704 (e.g., lead line 0518, curved line 0518, straight line, a curved or straight line 0520 with an arrow, a line 0518 without an arrow, a curved or straight line 0522 with an arrow at each end, a bracket 0524 or any combination thereof), for example, to indicate the location on the image of the element (e.g., of the at least one element of the image) to which the label corresponds;

optionally the location indicator is generated without any user input specifying (e.g., fully specifying or partially specifying) the location indicator, without any user input specifying the location indicator apart from providing rules or preferences for how the location indicator should be generated, without user input that fully specifies the location indicator, without requiring user input that specifies (e.g., partially specifies or fully specifies) the location indicator between (i) the step of displaying the image to the user or the step of communicating a provisional label to the user and (ii) the step of adding the label to the image, or any combination thereof;

optionally wherein the location indicator 0704 is configured so that a first end or portion of the location indicator 0704 is adjacent to the symbolic designation 0702;

optionally wherein the location indicator 0704 is configured so that a second end or portion of the location indicator 0704 touches the selected location on the image 0502 or points toward the selected location on the image 0502;

optionally wherein the location indicator 0704 comprises an arrow that points toward a region of the image 0502;

optionally wherein the location indicator 0704 comprises a bracket 0524 (e.g., curly bracket) and a point or portion of the closed end of the bracket is adjacent to the symbolic designation 0702 and an open end of the curly bracket faces toward a region of the image 0502 that is selected; or any combination thereof.

5. The method 0100, 0200 of any preceding clause, comprising:

optionally after adding the label 0118 to the image 0502, optionally, communicating 0210 to the user 0508 that a second provisional label 1102 (e.g., second label 1102, the first label 0512, an initial label, previously selected label, second default label, or label incorporating a second symbolic designation 1002) will be applied to the image 0502 before adding the second label 1102 (e.g., in the form of the second provisional label) to the image 0502;

optionally, communicating 0210 to the user 0508 that a second provisional label 1102 (e.g., second label 1102, the first label 0512, an initial label, previously selected label, second default label, or label incorporating a second symbolic designation 1002) will be applied to the image 0502 before receiving a second indication from the user 0508 identifying a second selected location on the image 0502;

optionally, wherein the communicating 0210 to the user 0508 that the second provisional label 1102 (e.g., second label 1102, the first label 0512, an initial label, previously selected label, second default label, or label incorporating a second symbolic designation 1002) will be applied to the image 0502 comprises displaying, making a noise, vibrating, moving, performing an action that can be perceived by a sense of touch, taste, smell, sound, or sight, performing an action that can be perceived by a human user 0508, performing an action that can be perceived by a machine, performing an action to affect a machine, performing an action to cause an intended effect on a machine, sending a signal, sending an electronic signal, sending a pneumatic signal, displaying the label that will be applied to the image 0502, displaying a location indicator that will be applied to the image 0502, displaying a corresponding symbolic designation 0702 (e.g., word, claim element, name, part number) that corresponds to a second location (e.g., a second selected location) on the image 0502, or any combination thereof;

optionally the communicating 0210 to the user 0508 that the second provisional label 1102 will be applied to the image occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally giving 0212 the user 0508 an opportunity to skip or change a second provisional label 1102 (e.g., the label, the first label 0512, an initial label, previously selected label, default label, a second label 1102, second provisional label 1102 or a combination thereof) that will be applied to the image 0502 before adding the label to the image 0502;

optionally giving 0112, 0212 the user 0508 an opportunity to skip a second provisional label 0512 (e.g., the label, the first label 0512, an initial label, previously selected label, default label, a second label 1102, second provisional label 1102 or a combination thereof) that will be applied to the image 0502 before adding the label to the image 0502;

optionally receiving an instruction to skip the second provisional label 0512, for example, via the user pressing a key, a plurality of keys, or a mouse button, or via using a mouse to identify a selected element different from the element corresponding to the provisional label 0512, the selected element being, for example, from a list of elements (e.g., elements recited in a patent claim) that correspond to elements in an image (e.g., a patent figure) or a plurality of images comprising the image;

optionally giving 0212 the user 0508 an opportunity to change a second provisional label 1102 (e.g., the label, the first label 0512, an initial label, previously selected label, default label, a second label 1102, or a combination thereof) that will be applied to the image 0502 before adding the label (e.g., the label, the first label 0512, an initial label, previously selected label, default label, a second label 1102, the second provisional label 1102, a second specifically selected label or a combination thereof) to the image 0502;

optionally giving 0212 the user 0508 an opportunity to change a second provisional label 1102 (e.g., the label, the first label 0512, an initial label, previously selected label, default label 1102, a second label, or a combination thereof) to a second specifically selected label;

optionally giving 0212 the user 0508 an opportunity to provide a second label indication (e.g., first label indication, second label indication, third label indication, indication via a user 0508 clicking a mouse 0310, indication via a user 0508 touching a screen, indication via a user 0508 illuminating a location with a laser, indication via a user 0508 moving a body, indication via a user 0508 making a hand motion, indication via a user 0508 moving an eye or eyes, indication via a user 0508 blinking an eye or eyes, indication via a user 0508 making a noise, indication via a user 0508 speaking a word, receiving information from an electrophysiological monitor of the user's 0508 brain activity or thoughts, or any combination thereof) to identify a specifically selected label (e.g., second specifically selected label) to be applied to the image 0502;

optionally the second label indication can comprise the user identifying (e.g., using a mouse to click on) a second provisional symbolic designation (e.g., a provisional reference number, which can appear in a claim displayed on the image display) and providing (e.g., typing) a second selected symbolic designation to replace the second provisional symbolic designation, optionally the second selected symbolic designation does not already appear in a set of symbolic designations corresponding to a list of elements (e.g., elements recited in a patent claim), which list of elements corresponds to elements in an image (e.g., a patent figure) or a plurality of images comprising the image, optionally the second selected symbolic designation does already appear in a set of symbolic designations corresponding to a list of elements (e.g., elements recited in a patent claim), which list of elements corresponds to elements in an image (e.g., a patent figure) or a plurality of images comprising the image;

optionally the second label indication can comprise giving the user an opportunity to change the name of a second specific element corresponding to a second provisional symbolic designation so that the second specific element has the name of any element in the list of elements corresponding to the second selected symbolic designation;

optionally the second label indication can comprise the user identifying (e.g., touching or using a mouse to click on) any portion of a second label (e.g., second provisional label) described herein and appearing anywhere on the image display (e.g., in a list or on an image) and then the user identifying (e.g., touching or using a mouse to click, optionally in combination with pressing another key) any portion of a different label described herein and appearing in a list or an image anywhere on the image display, thereby changing the second label (e.g., second provisional label) so that the portion of the second label (e.g., second provisional label) is changed to match the portion of the different label;

optionally the giving 0212 the user 0508 the opportunity to provide the second label indication occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally receiving 0214 a second label indication (e.g., first label indication, second label indication, third label indication, indication via a user 0508 clicking a mouse 0310, indication via a user 0508 touching a screen, indication via a user 0508 illuminating a location with a laser, indication via a user 0508 moving a body, indication via a user 0508 making a hand motion, indication via a user 0508 moving an eye or eyes, indication via a user 0508 blinking an eye or eyes, indication via a user 0508 making a noise, indication via a user 0508 speaking a word, receiving information from an electrophysiological monitor of the user's 0508 brain activity or thoughts, or any combination thereof) from the user 0508 identifying the specifically selected label (e.g., second specifically selected label) to be applied to the image 0502;

optionally receiving 0216 a second positional indication (e.g., first positional indication, second positional indication, third positional indication, indication via a user 0508 clicking a mouse 0310, indication via a user 0508 touching a screen, indication via a user 0508 illuminating a location with a laser, indication via a user 0508 moving a body, indication via a user 0508 making a hand motion, indication via a user 0508 moving an eye or eyes, indication via a user 0508 blinking an eye or eyes, indication via a user 0508 making a noise, indication via a user 0508 speaking a word, receiving information from an electrophysiological monitor of the user's 0508 brain activity or thoughts, or any combination thereof) from the user 0508 identifying the second selected location on the image 0502;

optionally the receiving 0216 the second label indication occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally adding 0218 a label (e.g., a first label 0512, second label 1102, third label, initial label 0512, previously selected label 0512, default label 0512, or the second specifically selected label) to the image 0502, for example, in accordance with the second label indication, optionally so that a portion of the label (e.g., any portion of a label described in this disclosure, any component of a label described in this disclosure, portion of a component of a label described in this disclosure, first end of a lead line adjacent to a symbolic designation 0702, for example a reference number, second end of a lead line opposite a symbolic designation 0702, a tip of an arrow of a lead line, an open end of a bracket, the closed end of a bracket, a pointed portion of the closed end of a bracket, or any combination thereof) is positioned at the selected location;

optionally the adding 0218 a label occurs via any system described in this disclosure, any computer 0312 described in this disclosure, any combination of the computers 0312 described in this disclosure, any user interface described in this disclosure, any component of a user interface described in this disclosure, any combination of the components of a user interface described in this disclosure, or any combination thereof;

optionally the method comprising any step described in this disclosure, any portion of a step described in this disclosure, any combination of steps described in this disclosure, or any combination of portions of steps described in this disclosure;

optionally the method comprising or using any component, any combination of components, any portion of a component, or any combination of portions of components described in this disclosure to perform any step described in this disclosure, any portion of a step described in this disclosure, any combination of steps described in this disclosure, or any combination of portions of steps described in this disclosure;

optionally, the method comprising:

communicating to the user that a provisional label will be applied to the image before receiving the positional indication from the user and before adding the label, in the form of the provisional label, to the image;

optionally, after the adding step, the method comprising the steps:

a. communicating to the user that a second provisional label will be applied to the image before receiving a second positional indication from the user and before adding a second label, in the form of the second provisional label, to the image;

b. receiving the second positional indication from the user identifying the second selected location on the image;

c. adding the second label to the image at a location corresponding to the second positional indication, the second label comprising a second symbolic designation to identify a second element of the at least one element, the second symbolic designation for the second label being generated (i) by the system (e.g., generated autonomously and/or automatically by the system), (ii) without the user fully specifying the symbolic designation, (iii) without the user partially specifying the symbolic designation or (iv) any combination thereof;

or any combination thereof.

6. A system 0302 configured to perform the method 0100, 0200 of any preceding clause.

7. A system 0302 comprising:

a. optionally a computer; and b. optionally a user interface in communication with the computer;

optionally the user interface comprising an image display and at least one input device configured to permit a user to communicate with the computer;

optionally the system (e.g., computer, user interface, any combination thereof, or any component thereof) configured to perform a method for adding a label to an image, the image comprising at least one element, optionally the method comprising:

optionally displaying the image to the user on the image display, the user interface configured to allow the user to move a visible location selector over a selected location on the image and identify the selected location, the at least one input device comprising a controller configured to control the visible location selector;

optionally receiving a positional indication from the user identifying the selected location on the image;

optionally adding a label to the image at a location corresponding to the positional indication, the label comprising a symbolic designation to identify an element of the at least one element, the symbolic designation for the label being (i) generated automatically by the system or (ii) generated without the user fully specifying the symbolic designation; or any combination thereof.

8. The system 0302 of any preceding clause:

optionally the computer being in communication with the user interface via the internet;

optionally the computer being located remotely relative to the user interface;

optionally the system comprising software configured to perform the method when executed by a computer, the computer configured to execute the software;

optionally the image being a figure for a patent application, the symbolic designation being an alphanumeric designation;

optionally the image being a figure for a patent application, the symbolic designation being a reference number corresponding to an element recited in a claim of the patent application;

optionally the label comprising a location indicator to indicate the location on the image of the element corresponding to the label;

optionally the location indicator for the label being generated (i) by the computer (e.g., automatically), (ii) without the user fully specifying the location indicator, (iii) without the user partially specifying the location indicator, or (iv) any combination thereof;

optionally the system being configured to allow the user to select a specifically selected image from a plurality of images;

optionally the plurality of images being displayed on the image display;

optionally the method comprising:

a. communicating to the user that a provisional label will be applied to the image before receiving the positional indication from the user and before adding the label, in the form of the provisional label, to the image;

b. after the adding step, the method comprising the steps:

c. communicating to the user that a second provisional label will be applied to the image before receiving a second positional indication from the user and before adding a second label, in the form of the second provisional label, to the image;

d. receiving the second positional indication from the user identifying the second selected location on the image;

e. adding the second label to the image at a location corresponding to the second positional indication, the second label comprising a second symbolic designation to identify a second element of the at least one element, the second symbolic designation for the second label being generated (i) by the system automatically, (ii) without the user fully specifying the symbolic designation, (iii) without the user partially specifying the symbolic designation, or any combination thereof;
f. or any combination thereof;
or
any combination thereof.
9. The system 0302 of any preceding clause:
optionally the system 0302 comprising the user interface 0300;
optionally the system 0302 comprising the image display 0510;
optionally the system 0302 comprising software configured to perform the method (e.g., when executed by a system, computer, user interface, any combination thereof, or any component thereof);
optionally the system (e.g., computer) or a device or combination of devices external to the system (e.g., server, network, device connected through the internet, a cloud-based server, any other device or combination of devices described herein, etc.) configured to execute the software;
optionally the user interface 0300 comprising the image display 0510;
optionally the computer being indirectly in communication with the user interface (e.g., the computer being in communication with the user interface via the internet but not directly);
optionally the computer being located remotely relative to the user interface and/or the user interface;
optionally the computer being directly in communication with the user interface (e.g., via direct wireless or wired connection);
optionally the computer being co-located with (e.g., adjacent or in proximity to) the user interface and/or the user interface;
optionally the user interface being co-located with (e.g., adjacent or in proximity to) the user; or
any combination thereof.
10. The system 0302 of any preceding clause:
the user interface 0300 comprising the image display 0510 (e.g., monitor, touchscreen), a controller for a visible location selector (e.g., a controller, a controller for a cursor, a controller for an arrow, a mouse 0310, a joystick, a key, a keyboard 0306, a touch pad, a touch screen, a sensor to detect movement of a user, or any combination thereof), a controller, a controller for a cursor, a controller for an arrow, a mouse 0310, a joystick, a key, a keyboard 0306, a touch pad, a touch screen, a sensor to detect movement of a user, a sound detector 0308 (e.g., microphone), a sound maker 0304 (e.g., speaker), a virtual reality system 0302, a virtual reality headset, a head mounted display, a sensor, a vibrator, a robot, a light detector 0324 (e.g., camera), or any combination thereof.
11. The system 0302 of any preceding clause, the system 0302 comprising:
a computer 0312 (e.g., a computing environment, a personal computer 0312, a desktop computer, a laptop computer, a notebook computer, a tablet computer, a handheld computer, an integrated office system, a virtual reality system, a personal digital assistant, a smart phone, a smart watch, a smart television set (T.V.), a cloud server, a virtual server, a cloud-based computer, a virtual machine, a virtual personal computer a network, the internet, or any combination thereof);
optionally wherein the computer 0312 comprises:
a processor 0402 (e.g., central processing unit (CPU));
memory 0404 (hard drive, solid state drive, connected memory 0404 devices (e.g., USB drive, CD, DVD, or any combination thereof) or any combination thereof;
optionally the computer storing software configured to execute the method;
optionally the user interface being in communication with the computer;
at least one input device (e.g., a touch screen, a touch pad, a mouse 0310, a keyboard 0306, a sound detector 0308 (e.g., microphone), an input port configured to receive information, any device (e.g., any device described herein) that is configured to permit a user to communicate with a computer, or any combination thereof;
at least one output device (e.g., a monitor, a screen, a printer, a touch screen, a vibrator, a sound maker 0304 (e.g., speaker), an output port configured to send information, or any device (e.g., any device described herein) that is configured to permit a computer to communicate with a user, or any combination thereof;
a network communicator (e.g., wired or wireless) configured to send information to a network, receive information from a network, or any combination thereof;
optionally wherein the network communicator comprises or forms a part of a router, wireless router, telecommunication device, a phone, a fax machine, a cellular phone, a telecommunication network, a wired network, a wireless network, a cable network, a fiberoptic cable network, or any combination thereof;
optionally wherein the network comprises a local area network, the internet, a device (e.g., a network, the internet, a server, a cloud-based server, a computer) or devices (e.g., combination of devices) 0412 outside the system, or any combination thereof;
optionally wherein the system comprises a line or lines of communication 0314, 0316, 0318, 0320, 0322, 0406, 0410, 0414 (e.g., direct line of communication or indirect line of communication, wired line of communication, wireless line of communication, cable or any combination thereof) from any component of the system to any other component of the system described in this disclosure or from any combination of components of the system to any other combination of components of the system described in this disclosure;
optionally wherein the system comprises a line 0414 or lines 0414 of communication (e.g., direct line of communication or indirect line of communication, wired line of communication, wireless line of communication, cable or any combination thereof) from the system or any component of the system to any device 0412 or devices (e.g., combination of devices) 0412 outside the system;
optionally wherein the system comprises a line or lines of communication 0314, 0316, 0318, 0320, 0322, 0406, 0410, 0414 (e.g., direct line of communication or indirect line of communication, wired line of communication, wireless line of communication, cable or any combination thereof) from the computer 0312 to any component described herein (e.g., the user interface 0300, any component of the user interface);
optionally wherein the system comprises a line or lines of communication 0314 (e.g., direct line of communication or indirect line of communication, wired line of communication, wireless line of communication, cable or any combination thereof) from the computer 0312 to the sound maker 0304;

optionally wherein the system comprises a line or lines of communication 0316 (e.g., direct line of communication or indirect line of communication, wired line of communication, wireless line of communication, cable or any combination thereof) from the computer 0312 to the image display 0510, the light detector 0324 (e.g., camera) or a combination thereof;

optionally wherein the system comprises a line or lines of communication 0318 (e.g., direct line of communication or indirect line of communication, wired line of communication, wireless line of communication, cable or any combination thereof) from the computer 0312 to the keyboard 0306;

optionally wherein the system comprises a line or lines of communication 0320 (e.g., direct line of communication or indirect line of communication, wired line of communication, wireless line of communication, cable or any combination thereof) from the computer 0312 to the mouse 0310;

optionally wherein the system comprises a line or lines of communication 0322 (e.g., direct line of communication or indirect line of communication, wired line of communication, wireless line of communication, cable or any combination thereof) from the computer 0312 to the sound detector 0308;

optionally wherein the system comprises a line or lines of communication 0410 (e.g., direct line of communication or indirect line of communication, wired line of communication, wireless line of communication, cable or any combination thereof) from the computer 0312 to a connected device 0408 or connected devices 0408 (e.g., any component of system described in this disclosure);

optionally wherein the system comprises a line or lines of communication 0406 (e.g., direct line of communication or indirect line of communication, wired line of communication, wireless line of communication, cable or any combination thereof) from the processor 0402 to memory 0404 (e.g., volatile memory, non-volatile memory, random access memory, solid state memory, a disk, a memory storage device, or any combination thereof);

optionally wherein the system comprises a line or lines of communication 0414 (e.g., direct line of communication or indirect line of communication, wired line of communication, wireless line of communication, cable or any combination thereof) from the system 0302 to a device 0412 or devices (e.g., combination of devices) 0412 outside the system (e.g., any network, the internet, line of communication, device or component described in this disclosure, or any combination thereof); or any combination thereof.

12. The system 0302 of any preceding clause:

optionally the system 0302 comprising or using any component, any combination of components, any portion of a component, or any combination of portions of components described in this disclosure; or optionally the system 0302 comprising or using any component, any combination of components, any portion of a component, or any combination of portions of components described in this disclosure to perform any step described in this disclosure, any portion of a step described in this disclosure, any combination of steps described in this disclosure, or any combination of portions of steps described in this disclosure.

13. The system 0302 of any preceding clause, the system comprising:

a computer 0312;

a processor 0402;

a memory 0404;

a connected device 0408, the connected device being in communication (e.g., direct or indirect communication) with the computer 0312, any component of a computer described in this disclosure, any combination of components of a computer described in this disclosure, a device outside the system 0412, devices outside the system 0412, or any combination thereof;

connected devices 0408, the connected devices being in communication (e.g., direct or indirect communication) with the computer 0312, any component of a computer described in this disclosure, any combination of components of a computer described in this disclosure, a device outside the system 0412, devices outside the system 0412, or any combination thereof; or any combination thereof.

14. A system 0302:

optionally the system of any preceding clause;

optionally the system being used to perform the method of any preceding clause;

optionally the system 0302 comprising or using any component, any combination of components, any portion of a component, or any combination of portions of components described in this disclosure;

optionally the system 0302 comprising or using any component, any combination of components, any portion of a component, or any combination of portions of components described in this disclosure to perform any step described in this disclosure, any portion of a step described in this disclosure, any combination of steps described in this disclosure, or any combination of portions of steps described in this disclosure; or any combination thereof.

The reference numbers in this application are provided for illustration only and are not limiting for the disclosure in general or any clauses in the additional embodiment section that recite reference numbers.

Throughout this application, the use of the abbreviation, "e.g." means "for example." The use of the abbreviation "i.e." means "that is."

As used in this application, the term "comprising" means "including, but not limited to." As used in this application, the term "consisting of" means "including and limited to."

Although embodiments have been described using the term "comprising" or its conjugates additional embodiments can be created by replacing the term "comprising" or its conjugates with "consisting essentially of" or "consisting of" or their conjugates. Additionally, although embodiments have been described using the term "consisting of" or its conjugates, additional embodiments can be created by replacing the term "consisting of" or its conjugates with "comprising" or "consisting essentially of" or their conjugates. Additionally, for any embodiment described using the term "consisting essentially of" or its conjugates, additional embodiments can be created by replacing the term "consisting essentially of" or its conjugates with "comprising" or "consisting of" or their conjugates.

Although embodiments have been described in the context adding reference numbers to at least one figure in a patent application, additional embodiments can be created in which the at least one figure is replaced with at least one image of any kind that comprises elements to be labeled. Moreover, additional embodiments can be created in which the reference numbers are replaced with any label. For example, rather than being limited to a reference number, the label can comprise any symbol, for example, a shape, a letter, a numeral, or any combination thereof. The label can also comprise lead lines extending from the symbol toward the element or elements corresponding to the label.

Although embodiments have been described with reference to a user, additional embodiments can be provided by replacing the user with a human, artificial intelligence, a machine directed by a human, or any combination thereof.

Although embodiments have been described with reference to a computer, additional embodiments can be provided by replacing the computer with a system comprising a computer, a computing environment, a personal computer, a desktop computer, a laptop computer, a notebook computer, a tablet computer, a handheld computer, an integrated office system, a virtual reality system, a personal digital assistant, a smart phone, a smart watch, a smart television set (T.V.), a network server, a cloud server, a virtual server, a cloud-based computer, a virtual machine, a virtual personal computer, a network, the internet, or any combination thereof.

Although embodiments have been described with reference to an interface (e.g., user interface), additional embodiments can be provided by replacing the interface with the image display (e.g., monitor, touchscreen), a controller for a visible location selector (e.g., a controller, a controller for a cursor, a controller for an arrow, a mouse, a joystick, a key, a keyboard, a touch pad, a touch screen, a sensor to detect movement of a user, or any combination thereof) a keyboard, a sound detector (e.g., microphone), a sound maker (e.g., speaker), a virtual reality system 0302, a virtual reality headset, a head mounted display, a sensor, a vibrator, a robot, or any combination thereof.

Additionally, embodiments have been described in which a component (e.g., user interface) or combination of components (e.g., a user interface) is used to accomplish a task described herein, a combination of tasks described herein, a portion of a task described herein, a combination of portions of a task or tasks described herein, a step described herein, a combination of steps described herein, a portion of a step described herein, or a combination of portions of a step or steps described herein. However, additional embodiments can be created in which any subcomponent, any combination of subcomponents, any portion, or any combination of portions of the component or combination of components is used to accomplish any task described herein, any combination of tasks described herein, any portion of a task described herein, any combination of portions of a task or tasks described herein, any step described herein, any combination of steps described herein, any portion of a step described herein, or any combination of portions of a step or steps described herein. For example, although an embodiment may describe a user interface as being used to move a visible location selector, the task or step can also be accomplished by an input device (e.g., a controller for the visible location selector).

Although embodiments have been described with reference to an image that is a figure for a patent application, additional embodiments can be created in which any image is or any images are a figure in a technical drawing, instructions for making or assembling furniture, a machine drawing, an engineering drawing, an equipment specification, a manufacturing specification, a figure for a patent application, a figure in a text book, any image or plurality of images for which adding one or more labels may be desirable, or any combination thereof.

Although embodiments have been described with reference to an arrow, cursor or other indicator to identify a location, in additional embodiments, any location identifier can be used. For example, any symbol can be used as a location identifier to identify a location where an action will be taken (e.g., placing a label) or a location where selected information is located (e.g., an image to be selected, a reference number or other symbol to be selected for use in a label, a specific type of lead line to be selected, a type of edit to be made or any combination thereof), or any combination thereof.

Embodiments have been described in this disclosure with reference to an element or a list of elements corresponding to an element or elements appearing in an image or a plurality of images to which a label can be added by a method and/or system described in this disclosure. Any such list of elements can be provided by a user for the method and/or system.

As another example, a list of elements can be generated by a user in conjunction with a method and/or system described herein. For example, a user can simply be given an opportunity to identify an element or plurality of elements by selecting a series of continuous words appear in language (e.g., a claim set). Then, the method and/or system described herein can be used to automatically assign a symbolic designation to the element.

Any list of elements described in this disclosure can also be automatically generated by the method and/or system, for example, by reviewing a claim set for a patent application comprising the elements that make up the list of elements or by reviewing information or text comprising the elements that make up the list of elements. Automatically generating the list of elements can be done according to any method and/or system known in the art or any document incorporated by reference in this disclosure.

As another example, a list of elements can be automatically generated (e.g., either fully or partially automatically generated) by any method and/or system described in this disclosure by using grammar rules to look for candidates for elements in a claim set or other information (e.g., language), and the user can be provided with an opportunity to accept, modify or reject the candidates for inclusion in the list of claim elements. To illustrate, a series of continuous words comprising a noun (for example, "a machine," or gerunds (e.g., "pleading")) and a qualifier, qualifiers, an adjective (e.g., "quick"), adjectives (e.g., "powerful, quick"), a noun acting as an adjective (e.g., "car wash" or "condition precedent"), nouns acting as adjectives (e.g., "car wash machine"), adverb (e.g., "unusually quick car wash"), adverbs (e.g., "most unusually quick car wash"), or any combination thereof directly or indirectly qualifying the noun, adjacent to the noun, preceding the noun, following the noun or any combination thereof can be deemed an element. Then, any subsequent appearance of the element can be considered non-unique (i.e., redundant) and assigned the same symbolic designation (e.g., a reference number) as an earlier occurrence of the element. Thus, a list of unique (i.e., non-redundant) elements can be established. Furthermore, any label added to an image for an element can include the symbolic designation.

After a list of elements exists and is available to a method and/or system, a method and/or system disclosed herein can, for each element or any selection of elements in the list of elements (e.g., to be included in a label to be applied to an image or a plurality of images), assign a provisional symbolic designation to the element, optionally give the user an opportunity to change the provisional symbolic designation for the element to a specifically selected symbolic designation, give the user an opportunity to provide a positional indication to identify a location on an image corresponding to the element, and apply a label comprising the provisional or specifically selected symbolic designation to the image.

Additionally, each symbolic designation for each element or a selection of elements in a list of elements described in this disclosure can be automatically generated. For example, a first set of symbolic characters in the symbolic designation (e.g., numbers, letters, symbols, or any combination thereof in the first 1, 2, 3, or 4 places of the symbolic designation) can correspond to a symbolic designation (e.g., Figure number, such as FIG. 1, 2, 3, 10, 22, etc.) assigned to an image. Further, a second set of symbolic characters in the symbolic designation (e.g., numbers, letters, symbols, or any combination thereof in the next 1, 2, 3, or 4 places of the symbolic designation) can correspond to a symbolic designation (e.g., element number, such as 1, 2, 3, 10, 22, etc.) assigned to each element appearing in an image. To illustrate, if each image in a set of 10 images is identified using a one- or two-digit number from 1 to 10, and each element appearing in each image is assigned a two digit number from 00 to 99, then the first five elements in the image identified as FIG. 1 could be assigned the following symbolic designations: 0101, 0102, 0103, 0104, and 0105; and the first five elements in the image identified as FIG. 2 could be assigned the following symbolic designations: 0201, 0202, 0203, 0204, and 0205. As another illustration, if the element numbers are assigned by counting by an integer other than one (e.g., two), the first five elements in the image identified as FIG. 1 could be assigned the following symbolic designations: 0102, 0104, 0106, 0108, and 0110; and the first five elements in the image identified as FIG. 10 could be assigned the following symbolic designations: 1002, 1004, 1006, 1008, and 1010. As a skilled person would understand upon reading this disclosure, these approaches for automatically generating each symbolic designation for each element or a selection of elements in a list of elements is illustrative, and non-limiting. Accordingly, additional embodiments can be provided using other approaches.

Although embodiments have been described with reference to an action (e.g., by a user), an interaction (e.g., by a user with a user interface or a computer or any component or combination of components described herein), an indication of any kind, an identification step or any combination thereof, in additional embodiments, the action, interaction, indication, identification or any combination thereof can be replaced by another action, interaction, indication, identification or any combination thereof described herein or by a user 0508 clicking a mouse 0310, a user 0508 touching a screen, a user 0508 illuminating a location with a laser, a user 0508 moving the body or portion of a body of the user, a user 0508 making a hand motion, a user 0508 moving an eye or eyes, a user 0508 blinking an eye or eyes, a user 0508 making a noise, a user 0508 speaking a word, receiving information from an electrophysiological monitor of the user's 0508 brain activity or thoughts, a user making a sound whether directly or indirectly, or any combination thereof.

Although examples have been described using a "default" item of some type, it should be understood that in some embodiments, the user will have the ability to set the default item to a selected default item, for example, having selected characteristics.

Although some image displays comprise a single device (e.g., monitor, touch screen or any other device described herein) for displaying an image, additional embodiments can be provided in which the image display comprises a plurality of the devices. Accordingly, when an item is described as being displayed on an image display, it can be displayed on a single device or a plurality of devices.

Embodiments of this disclosure have been described with reference to a device or devices (e.g., a combination of devices, optionally in communication) outside a system described herein. Nonetheless, additional embodiments can be created in which the device or devices outside the system form a part of the system. Examples of devices or devices that can be outside the system include, but are not limited to, a network, the internet, a server, a cloud-based server, a computer, or any combination thereof.

Although embodiments are described herein using a term that is singular, additional embodiments can be provided in which the singular term is replaced with the corresponding plural term (e.g., "monitor," "a monitor," "the monitor," or "one monitor" can be replaced with "monitors," "the monitors," "a plurality of monitors," or "the plurality of monitor"). Similarly, although embodiments are described herein using a term that is plural, additional embodiments can be provided in which the plural term is replaced with the corresponding singular term (e.g., "monitors," "a plurality of monitors," or "the plurality of monitors" can be replaced with "monitor," "a monitor," "the monitor," or "one monitor").

When the term "at least one" or similar language is used in this application, it means one or more. Accordingly, although embodiments are described using "at least one" item, additional embodiments can be provided by replacing "at least one" of the item with "an" or "the" item, "one" of the item, "at least two" of the items or "a plurality of" items (e.g., "at least one monitor" or "the at least one monitor" can be replaced with "a monitor," "the monitor" "a plurality of monitors," or "the plurality of monitors").

Although examples have been described with reference to methods having a series of ordered steps, additional examples can be provided in which the order is changed by moving any step or selection of steps sooner or later in the ordered series of steps.

For any specific step described in this application as capable of being equivalent or analogous to a reference step, the specific step can include any step or substep or feature, or any combination of steps or substeps or features described with reference to the reference step, and optionally the elements of the reference step can be replaced by the analogous elements in the specific step. Similarly, when any specific step is described in this application as capable of being equivalent or analogous to a reference step, the reference step can include any step or substep or feature, or any combination of steps or substeps or features described with reference to the specific step, and optionally the elements of the specific step can be replaced by the analogous elements in the reference step.

Although examples have been described with reference to a number, in some embodiments, the number can be considered an ordinal number designating position in a list or order of steps. Although examples have been described with reference to a number, in some embodiments, the number can be considered an ordinal number designating how many of something are present. Although examples have been described with reference to a number, in some embodiments, the number can be considered a merely nominal number designating the name of something for purposes of distinguishing it from something else. If a type of number is not indicated by the application, the number is a nominal number used for naming purposes. However, in additional embodiments, the nominal number can be deemed an ordinal number or a cardinal number, or both.

Although examples have been described using a limited number of steps for the sake of illustration, additional embodiments can be created using any number of steps by repeating any step or any combination of steps described herein any number of times. To illustrate, although an example might be provided in which one step or a series of steps is repeated once, and additional embodiment can be created in which the step or series of steps is repeated any number of times, for example, repeated one to 1000 times or any integer number included in this range. Additionally, in some embodiments an item is reference in a step or a first item is referenced in a first step or a second item is referenced in a second step; however, additional embodiments can be provided in which a subsequent step or subsequent steps are provided in which the item, first item, or second item is replaced with an item identified by a number corresponding to the number of the subsequent step. For example, if a first step recites a first positional indication, an additional embodiment can be created in which a second step is analogous to the first step and the first positional indication is replaced with a second positional indication. As another example, if a second step recites a second positional indication, an additional embodiment can be created in which a third step is analogous to the second step and the second positional indication is replaced with a third positional indication.

As used in this disclosure, describing a first item "and/or" a second item describes (i) the first item or the second item and (ii) the first item and the second item. In other words, each of options (i) and (ii) is described in this disclosure when the term "and/or" is used in combination with a first item and a second item, whatever those items happen to be in a particular passage.

Although embodiments have been described using the terms "providing," "permitting," "allowing," "giving," "for," "to," their conjugates or similar terms in combination with a specific objective, advantage, function, characteristic or any combination thereof; additional embodiments can be provided in which the embodiment is "configured for" achieving or "configured to" achieve the specific objective, advantage, function, characteristic or any combination thereof. For example, if one embodiment describes "giving 0112 the user 0508 an opportunity to skip applying a provisional label" an additional embodiment can be created in which a method and/or system is "configured to give the user an opportunity to skip applying a provisional label."

Throughout the application, methods and/or systems have been disclosed for labeling an image. Software (e.g., data or information that can be read by a computer and code or instructions to perform tasks that can be read and executed by a computer) loaded on a system (e.g., component of a system, components of a system, computer, or computers) can be used to perform any method described herein. Furthermore, the system can be a fully local system or a partially remote system relative to a user of the method and/or system. An example of a fully local system is a system that comprises a computer and user interface, which can be located in a user's hand like a smart phone or at a desk where a user sits or stands to operate the computer and interact with the user interface. The computer can be loaded with software to perform any method described herein. The software can be stored on machine or computer readable medium (e.g., memory) that forms a part of the computer or on external memory in direct or indirect communication with the computer. The computer can also be connected to or in communication with a remote platform 0326 (e.g., so that the computer can send and receive information from the remote platform 0326 via a line of communication 0328, which can be direct, indirect, wired, wireless or any combination thereof) even if the software for performing the method is not stored on the remote platform. Examples of a remote platform include a remote server, a cloud-based server, a network, the internet, or any combination thereof. An example of a partially remote system is a system comprising a computer and a user interface located at a desk where a user sits or stands to operate the computer and interact with the user interface, the computer being connected to a remote platform where the software for performing any method described herein can be stored and/or run. To provide a further illustration of a partially remote system, the computer can be used to access an internet webpage that enables the computer and user interface to communicate with a remote platform running software used to perform any method described in this disclosure. When the method needs to receive input from a user, the user can provide this input by interacting with the user interface, the input can be communicated to the computer, and from the computer to the platform running the software to perform the method. Furthermore, when the method needs to communicate information to a user, the platform can provide the information to a user by sending the information to the computer, which can communicate the information to the user via the user interface.

As can be seen, any system, any component of a system, any components of a system, any devices outside the system, any network, any server, any other device or combination of devices described expressly or by incorporation by reference in this disclosure, or any combination thereof can be used to store or execute software for purposes of performing any method described in this disclosure, any step of the method, any combination of steps of the method in any order, any portion of a step of the method, or any combination of portions of a step of the method in any order.

Although embodiments have been described in which a first component is in communication with a second component, additional embodiments can be created in which the first component is in direct communication (e.g., via a direct wireless connection, a direct wired connection, or any combination thereof) with the second component or indirect communication (e.g., via a network or the internet, or any combination thereof) with the second component;

Examples of components being in communication with each other include electronic communication. Components that are in communication with each other are able to share information. For example, a first component can send information to a second component, the second component can send information to the first component, or both.

Although non-limiting, illustrative examples have been described in this disclosure, for example, with reference to the accompanying drawings, various equivalents, modifications and alternatives to the illustrative examples provided in this disclosure will be apparent to those skilled in the art. These equivalents, modifications and alternatives are to be understood as included in the scope of this disclosure. Novel features believed to be characteristic of selected embodiments of the disclosed invention are recited in the appended claims. Nonetheless, there is no intention to exclude equivalents or modifications of the disclosed invention that may be practiced without departing from the spirit and scope of the invention. Rather, the scope of the claimed invention is intended to cover all equivalents of the subject matter defined in the claims.

What is claimed is:

1. A system comprising:
   a computer; and
   a user interface in communication with the computer;
   the user interface comprising an image display and at least one input device configured to permit a user to communicate with the computer;
   the system configured to perform a method for adding at least one label to a figure for a patent application, the figure comprising claim elements recited in at least one claim of the patent application, the method comprising:
   receiving or automatically identifying a list of the claim elements recited in the at least one claim of the patent application;
   displaying the figure to the user on the image display, and communicating to the user that a provisional label will be applied to the figure, the communicating comprising displaying on the image display a claim element of the list of the claim elements recited in the at least one claim, the claim element also appearing in the figure, the user interface configured to allow the user to move a visible location selector over a selected location on the figure and identify the selected location corresponding to the claim element, the at least one input device comprising a controller configured to control the visible location selector;
   after displaying the claim element on the image display, receiving a positional indication from the user identifying the selected location on the figure; and
   adding a label to the figure at a location corresponding to the positional indication, the label comprising an alphanumeric symbolic designation to identify the claim element, the alphanumeric symbolic designation for the label being (i) generated automatically by the system or (ii) generated without the user fully specifying the alphanumeric symbolic designation.

2. The system of claim 1,
   the computer being in communication with the user interface via the internet.

3. The system of claim 1,
   the computer being located remotely relative to the user interface.

4. The system of claim 1,
   the system comprising software configured to perform the method when executed by a computer, the computer of the system configured to execute the software.

5. The system of claim 1,
   the alphanumeric symbolic designation being a reference number corresponding to the claim element.

6. The system of claim 1,
   the label comprising a location indicator to indicate the location corresponding to the positional indication where the claim element corresponding to the label is located on the figure, and
   the location indicator for the label being generated (i) by the computer or (ii) without the user fully specifying the location indicator.

7. The system of claim 1,
   the system being configured to allow the user to select a specifically selected figure from a plurality of figures comprising the figure.

8. The system of claim 7,
   the plurality of figures being displayed on the image display.

9. The system of claim 1,
   the method comprising:
   communicating to the user that the label will be applied to the figure before receiving the positional indication from the user and before adding the label, in the form of the provisional label, to the figure;
   and after the adding step, the method comprising the steps:
   communicating to the user that a second provisional label will be applied to the figure before receiving a second positional indication from the user and before adding a second label, in the form of the second provisional label, to the figure;
   receiving the second positional indication from the user identifying a second selected location on the figure; and
   adding the second label to the figure at a location corresponding to the second positional indication, the second label comprising a second alphanumeric symbolic designation to identify a second claim element of the claim elements recited in the at least one claim of the patent application, the second claim element also appearing in the figure, the second alphanumeric symbolic designation for the second label being generated (i) by the system automatically, (ii) without the user fully specifying the second alphanumeric symbolic designation, and (iii) without the user partially specifying the second alphanumeric symbolic designation.

10. A method for adding at least one label to at least one figure for a patent application, each figure in the at least one figure comprising at least one claim element recited in at least one claim of the patent application, the method comprising:
    receiving or automatically identifying a list of claim elements recited in the at least one claim of the patent application;
    displaying a first figure of the at least one figure to a user on an image display, and communicating to the user that a first provisional label will be applied to the first figure, the communicating comprising displaying on the image display a first claim element of the list of claim elements, the first claim element also appearing in the first figure, the image display being a component of a user interface, the user interface configured to allow the user to move a visible location selector over a first selected location on the first figure and identify the first selected location corresponding to the first claim element;
    receiving a first positional indication from the user identifying the first selected location on the first figure;
    adding a first label, in the form of the first provisional label, to the first figure at a first location corresponding to the first positional indication, the first label comprising a first alphanumeric symbolic designation to identify the first claim element, the first alphanumeric symbolic designation for the first label being generated (i) by a system comprising the user interface and (ii) without the user fully specifying the first alphanumeric symbolic designation; and
    the communicating to the user that the first provisional label will be applied to the first figure occurring before receiving the first positional indication from the user and before adding the first label, in the form of the first provisional label, to the first figure.

11. The method of claim 10, the method comprising:
    allowing the user to use the user interface to select a specifically selected figure from a plurality of figures, the first figure being the specifically selected figure.

12. The method of claim 10,
the first alphanumeric symbolic designation being a first reference number corresponding to the first claim element.

13. The method of claim 10,
the first label comprising a first location indicator to indicate the first location corresponding to the first positional indication where the first claim element corresponding to the first label is located on the first figure, and
the first location indicator for the first label being generated (i) by a computer automatically or (ii) without the user fully specifying the first location indicator.

14. The method of claim 13, the method comprising:
giving the user an opportunity to change the first label to a first specifically selected label by giving the user an opportunity to provide a first label indication after the first label is applied to the first figure;
the first label indication comprising: (i) allowing the user to change the first alphanumeric symbolic designation of the first label to a specifically selected alphanumeric symbolic designation, (ii) allowing the user to change the first location indicator to a specifically selected location indicator, (iii) allowing the user to change the position of the first alphanumeric symbolic designation of the first label, (iv) allowing the user to change the position of the first location indicator of the first label, or (v) any combination thereof.

15. The method of claim 11, the method comprising:
displaying the plurality of figures on the image display.

16. The method of claim 10,
after the step of adding the first label, the method comprising the steps:
communicating to the user that a second provisional label will be applied to the first figure before receiving a second positional indication from the user and before adding a second label, in the form of the second provisional label, to the first figure;
receiving the second positional indication from the user identifying a second selected location on the first figure; and
adding the second label to the first figure at a second location corresponding to the second positional indication, the second label comprising a second alphanumeric symbolic designation to identify a second claim element of the list of claim elements, the second claim element also appearing in the first figure, the second alphanumeric symbolic designation for the second label being generated (i) by the system, (ii) without the user fully specifying the second alphanumeric symbolic designation, and (iii) without the user partially specifying the second alphanumeric symbolic designation.

17. The method of claim 16:
the second alphanumeric symbolic designation for the second label being generated by selecting four digits in a four-digit number, the first two digits in the four-digit number corresponding to a figure number of the first figure, the figure number being a two-digit integer from 00 to 99, and the second two digits in the four-digit number corresponding to a second reference number for the second claim element, the second reference number being a two-digit integer from 00 to 99, and the second reference number being automatically generated by starting with 00 and counting by a specified integer until arriving at a two-digit integer that has not yet been assigned to a claim element of the first figure.

18. The method of claim 17:
the first alphanumeric symbolic designation for the first label being automatically generated by the system, the system assigning the four-digit number 0100 as the first alphanumeric symbolic designation, and
the second alphanumeric symbolic designation for the second label being automatically generated by the system, the system assigning the four-digit number 0101 as second alphanumeric symbolic designation.

19. A non-transitory computer readable storage medium storing instructions, the instructions, when executed by a computer, configured to cause performance of steps comprising the method of claim 10.

20. The system of claim 1, the system configured such that, after the step of communicating to the user that the provisional label will be applied to the figure, the receiving the positional indication from the user is the only user input required to occur before the step of adding the label to the figure at the location corresponding to the positional indication.

21. The system of claim 1, the system configured such that, after the step of communicating to the user that the provisional label will be applied to the figure, the receiving the positional indication from the user is the only user input occurring before the step of adding the label to the figure at the location corresponding to the positional indication.

22. The system of claim 1, the method comprising:
displaying the claim element to the user on the image display comprises displaying a reference number corresponding to (1) the claim element and (2) the label.

23. The method of claim 10, the method comprising:
after the step of communicating to the user that the first provisional label will be applied to the first figure, the receiving the first positional indication from the user being the only user input required to occur before the step of adding the first label to the first figure at the first location corresponding to the first positional indication.

* * * * *